US011560969B2

(12) United States Patent
Belen et al.

(10) Patent No.: US 11,560,969 B2
(45) Date of Patent: Jan. 24, 2023

(54) PIPE HANGER WITH LOCK TAB WASHER

(71) Applicant: ASC Engineered Solutions, LLC, Portsmouth, RI (US)

(72) Inventors: Jordan Cameron Belen, West Warwick, RI (US); Matthew William McNamara, Portsmouth, RI (US); Jason F. Santos, Providence, RI (US)

(73) Assignee: ASC Engineered Solutions, LLC, Portsmouth, NH (US)

(*) Notice: Subject to any disclaimer, the term of this patent is extended or adjusted under 35 U.S.C. 154(b) by 0 days.

(21) Appl. No.: 17/023,032

(22) Filed: Sep. 16, 2020

(65) Prior Publication Data

US 2021/0080032 A1    Mar. 18, 2021

Related U.S. Application Data

(63) Continuation-in-part of application No. 16/573,129, filed on Sep. 17, 2019, now Pat. No. 11,359,747.

(51) Int. Cl.
*F16L 3/11* (2006.01)
*F16L 3/133* (2006.01)
*F16B 39/10* (2006.01)

(52) U.S. Cl.
CPC ............. *F16L 3/11* (2013.01); *F16B 39/108* (2013.01); *F16L 3/133* (2013.01)

(58) Field of Classification Search
CPC . F16L 3/11; F16L 3/133; F16L 3/1008; F16L 3/20; F16B 39/103; F16B 39/108; F16B 37/04; F16B 39/24; Y10S 411/983; Y10T 403/75
USPC .................................. 411/122–124; D8/399
See application file for complete search history.

(56) References Cited

U.S. PATENT DOCUMENTS

| 21,574 A | | 9/1858 | Noblet | |
| 502,195 A | * | 7/1893 | Jones | F16B 39/108 411/123 |
| 508,757 A | * | 11/1893 | Reed | F16B 39/108 411/983 |

(Continued)

FOREIGN PATENT DOCUMENTS

| EP | 0769647 | 4/1997 |
| GB | 186552 | 10/1922 |
| WO | 2021055479 | 3/2021 |

OTHER PUBLICATIONS

Belen, Jordan Cameron; Non-Final Office Action for U.S. Appl. No. 16/573,129, filed Sep. 17, 2019, dated Mar. 31, 2021, 20 pgs.

(Continued)

*Primary Examiner* — Jonathan Liu
*Assistant Examiner* — Guang H Guan
(74) *Attorney, Agent, or Firm* — Taylor English Duma LLP

(57) ABSTRACT

A lock tab washer, a pipe hanger, and a method of assembling a pipe hanger are disclosed. The lock tab washer can comprise a washer body, the washer body defining a first side and a second side opposite the first side, the washer body defining a hole therethrough; an edge tab extending from the first side of the washer body, the edge tab define a first section and a second section, the second section bent relative to the first section; a nut tab extending from the second side of the washer body, the nut tab bent relative to the washer body; and a wing extending from the nut tab, the wing bent relative to the nut tab.

7 Claims, 20 Drawing Sheets

(56) References Cited

U.S. PATENT DOCUMENTS

| | | | | |
|---|---|---|---|---|
| 717,321 | A | * | 12/1902 | Ball ............... F16B 39/108 411/123 |
| 753,588 | A | | 3/1904 | Kunkle |
| 759,039 | A | * | 5/1904 | Smith ............... F16B 39/108 411/984 |
| 858,191 | A | * | 6/1907 | Logan ............... F16B 39/108 411/201 |
| 874,121 | A | * | 12/1907 | Sevcik ............... E01B 11/10 238/193 |
| 924,467 | A | * | 6/1909 | Humphrey ......... F16B 39/108 411/235 |
| 930,806 | A | | 8/1909 | Smith |
| 1,077,763 | A | * | 11/1913 | Stark ............... F16B 39/24 411/254 |
| 1,091,177 | A | | 3/1914 | Winberg |
| 1,314,433 | A | * | 8/1919 | Sheets ............... F16B 39/108 411/201 |
| 1,327,435 | A | | 1/1920 | Kurtz |
| 1,397,820 | A | | 11/1921 | Newcomb |
| 1,512,551 | A | | 10/1924 | McDonald |
| 1,707,933 | A | | 6/1928 | Gibbons |
| 3,001,634 | A | | 9/1961 | Bauder |
| 3,068,924 | A | | 12/1962 | Summers |
| 3,970,707 | A | | 7/1976 | Shvedov et al. |
| 4,096,621 | A | | 6/1978 | Berger et al. |
| 4,305,557 | A | | 12/1981 | Kowalski |
| 4,809,601 | A | | 3/1989 | Sandstrom |
| 5,009,386 | A | | 4/1991 | Berger et al. |
| 5,082,216 | A | | 1/1992 | Roth |
| 5,188,317 | A | | 2/1993 | Roth |
| 5,848,770 | A | | 12/1998 | Oliver et al. |
| D412,833 | S | | 8/1999 | Cassel |
| 5,938,173 | A | * | 8/1999 | Hayakawa ......... F16K 5/0694 411/196 |
| 6,050,035 | A | | 4/2000 | Thompson et al. |
| 6,224,025 | B1 | | 5/2001 | Alvarez |
| 6,505,796 | B1 | | 1/2003 | Roth |
| 6,588,713 | B2 | | 7/2003 | Kilkenny |
| 7,097,141 | B2 | | 8/2006 | Heath |
| 7,284,728 | B2 | | 10/2007 | Connolly |
| 7,325,776 | B2 | | 2/2008 | Shibuya |
| 8,100,368 | B2 | | 1/2012 | Jackson et al. |
| 9,038,966 | B2 | | 5/2015 | Bundren et al. |
| 9,518,683 | B1 | | 12/2016 | Heppler |
| 9,903,524 | B2 | | 2/2018 | Lange et al. |
| 10,184,598 | B2 | | 1/2019 | Williams et al. |
| 10,239,192 | B2 | | 3/2019 | Guyomard |
| 10,686,345 | B2 | * | 6/2020 | Evans ............... H02K 11/20 |
| 11,359,747 | B2 | | 6/2022 | Belen et al. |
| 2006/0138286 | A1 | | 6/2006 | Connolly |
| 2009/0321587 | A1 | | 12/2009 | Thackeray |
| 2011/0027039 | A1 | | 2/2011 | Blair |
| 2012/0318934 | A1 | | 12/2012 | Thomas |
| 2013/0126681 | A1 | | 5/2013 | Greenfield |
| 2014/0017027 | A1 | | 1/2014 | Benzing |
| 2015/0101174 | A1 | | 4/2015 | Williams et al. |
| 2016/0003288 | A1 | | 1/2016 | Richards |
| 2017/0184144 | A1 | | 6/2017 | Lee |
| 2021/0080032 | A1 | * | 3/2021 | Belen ............... F16L 3/11 |
| 2021/0080033 | A1 | | 3/2021 | Belen et al. |
| 2022/0228677 | A1 | | 7/2022 | Belen et al. |

OTHER PUBLICATIONS

Belen, Jordan Cameron; International Search Report and Written Opinion for PCT Application No. PCT/US2020/051074, filed Sep. 16, 2020, dated Jan. 27, 2021, 15 pgs.

Belen, Jordan Cameron; Final Office Action for U.S. Appl. No. 16/573,129, filed Sep. 17, 2019, dated Nov. 6, 2020, 18 pgs.

Belen, Jordan Cameron; Non-Final Office Action for U.S. Appl. No. 16/573,129, filed Sep. 17, 2019, dated Jul. 15, 2020, 28 pgs.

Belen, Jordan Cameron; Requirement for Restriction/Election for U.S. Appl. No. 16/573,129, filed Sep. 17, 2019, dated Jun. 5, 2020, 9 pgs.

Defense Documentation Center (U.S.), Plastics: An ASTIA Report Bibliography, 1962, https://books.google.com/books/about/Plastics.html?id=c9grAQAAMAAJ. (Year: 1962).

Belen, Jordan Cameron; Final Office Action for U.S. Appl. No. 16/573,129, filed Sep. 17, 2019, dated Sep. 28, 2021, 24 pgs.

Belen, Jordan Cameron; International Preliminary Report on Patentability for PCT Application No. PCT/US2020/051074, filed Sep. 16, 2020, dated Nov. 12, 2021, 38 pgs.

Belen, Jordan Cameron; Notice of Allowance for U.S. Appl. No. 16/573,129, filed Sep. 17, 2019, dated Jan. 4, 2022, 10 pgs.

* cited by examiner

PIPE HANGER WITH LOCK TAB WASHER

CROSS-REFERENCE TO RELATED APPLICATIONS

The present application is a continuation-in-part of U.S. patent application Ser. No. 16/573,129, filed Sep. 17, 2019, which is hereby specifically incorporated by reference herein in its entirety.

TECHNICAL FIELD

This disclosure relates to hanging pipes. More specifically, this disclosure relates to a pipe hanger with a lock tab washer.

BACKGROUND

Pipes, such as water pipes in a building for sprinkler systems or residential or commercial water use, can be suspended from ceilings by pipe hangers, such as clevis hangers. The parts of a clevis hanger can be secured by attachment mechanisms such as nuts and bolts. These nuts and bolts can loosen, especially in the presence of movement, such as vibrations due to seismic events or everyday vibrations from foot traffic or machine vibrations, or even vibrations from fluid flow and water hammer in the pipes themselves.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a hanger for a pipe, the hanger comprising: a suspension member configured to engage the pipe, the suspension member comprising a side edge and defining a hole in through the suspension member; a threaded rod extending through the hole; a nut threaded on the threaded rod; and a lock tab washer disposed on the threaded rod between the suspension member and the nut, the lock tab washer comprising a first tab and a second tab, the first tab bent over a side edge of the suspension member, the first tab configured to prevent the lock tab washer from rotating with respect to the suspension member, the second tab bent over a circumferential side of the nut, the second tab configured to prevent the nut from rotating with respect to the lock tab washer.

Also disclosed is a method of securing a pipe in a hanger, the method comprising: supporting the pipe with a suspension member; inserting a threaded rod through the suspension member; placing a lock tab washer on the threaded rod; threading a nut on the threaded rod; preventing the lock tab washer from rotating with respect to the suspension member by folding a first tab of the lock tab washer over a side edge of the suspension member; and preventing the nut from rotating with respect to the lock tab washer by folding a second tab of the lock tab washer over a circumferential side of the nut.

Disclosed is a lock tab washer comprising a washer body, the washer body defining a first side and a second side opposite the first side, the washer body defining a hole therethrough; an edge tab extending from the first side of the washer body, the edge tab define a first section and a second section, the second section bent relative to the first section; a nut tab extending from the second side of the washer body, the nut tab bent relative to the washer body; and a wing extending from the nut tab, the wing bent relative to the nut tab.

A pipe hanger is also disclosed, the pipe hanger comprising a suspension member configured to engage the pipe, the suspension member comprising a side edge and defining a hole in through the suspension member; a threaded rod extending through the hole; a nut threaded on the threaded rod, the nut defining a circumferential side, the circumferential side defining a first face and a second face; and a lock tab washer disposed on the threaded rod between the suspension member and the nut, the lock tab washer comprising an edge tab, a nut tab, and a wing extending from the nut tab, the edge tab bent to fold over the side edge of the suspension member, the nut tab bent to fold over the first face of the circumferential side of the nut, the wing bent to fold over the second face of the circumferential side of the nut.

A method of assembling a pipe hanger is disclosed, the method comprising inserting a threaded rod through a suspension member; placing a lock tab washer on the threaded rod, the lock tab washer defining an edge tab, a nut tab, and a wing extending from the nut tab; threading a nut on the threaded rod, the nut defining a circumferential side defining a first face and a second face, the lock tab washer oriented between the suspension member and the nut; folding the edge tab over a side edge of the suspension member; folding the nut tab over the first face of the circumferential side of the nut; and folding the wing over the second face of the circumferential side of the nut.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
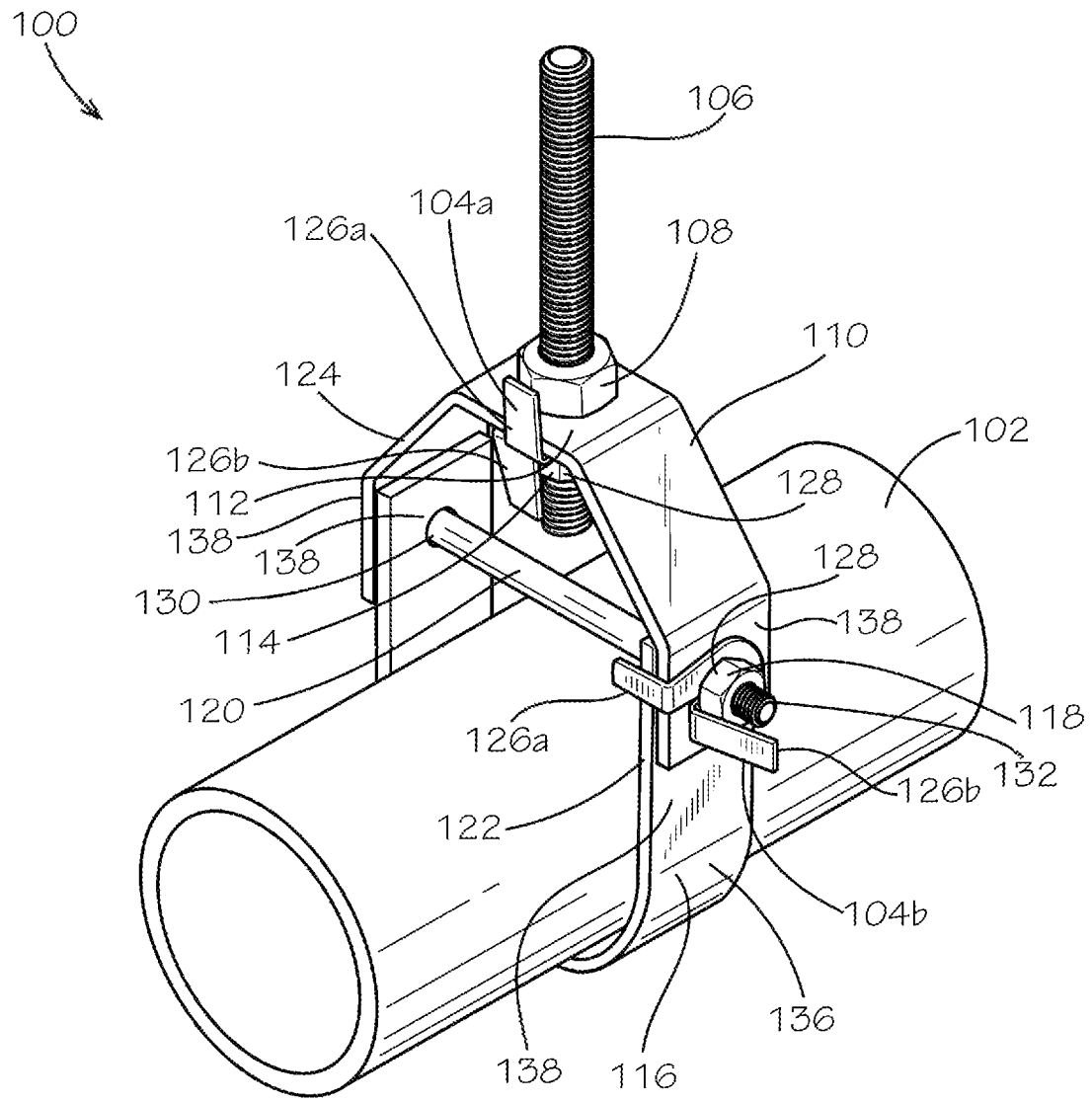
FIG. 1 is a perspective view of a pipe hanging from a hanger comprising a lock tab washer according to one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

The use of the directional terms herein, such as right, left, front, back, top, bottom, and the like can refer to the orientation shown and described in the corresponding figures, but these directional terms should not be considered limiting on the orientation or configuration required by the present disclosure. The use of ordinal terms herein, such as first, second, third, fourth, and the like can refer to elements associated with elements having matching ordinal numbers. For example, a first light bulb can be associated with a first light socket, a second light bulb can be associated with a second light socket, and so on. However, the use of matching ordinal numbers should not be considered limiting on the associations required by the present disclosure. An element such as a light bulb can be a genus element that encompasses species elements such as an upper light bulb and a lower light bulb. As such, a numeric designator such as 100 can refer to the light bulb and an alphanumeric designator such as 100a and 100b can refer to the upper light bulb and the lower light bulb, for example and without limitation.

Disclosed is a pipe hanger comprising a lock tab washer and associated methods, systems, devices, and various apparatus. It would be understood by one of skill in the art that the hanger is described in but a few exemplary embodiments among many. No particular terminology or description should be considered limiting on the disclosure or the scope of any claims issuing therefrom.

FIG. 1 is a perspective view of a pipe 102 hanging from a pipe hanger 100 comprising a lock tab washer 104. In this aspect, the hanger 100 can comprise two lock tab washers 104, such as a top lock tab washer 104a and a side lock tab washer 104b. The hanger 100 can be a clevis hanger 100 and can comprise a threaded rod 106, a top nut 108 disposed on the threaded rod 106, and an upper clevis 110 disposed on the threaded rod 106 below the top nut 108. The upper clevis 110 can be, for example and without limitation, a strap stamped from sheet metal. The upper clevis 110 can receive the threaded rod 106 through a rod hole (hidden behind top nut 108) in a top flattened section 112 of the upper clevis 110. The top lock tab washer 104a can be placed on the threaded rod 106 below the rod hole of the upper clevis 110. A securing nut 114 (shown more clearly in FIG. 4) can be disposed on the threaded rod 106 below the lock tab washer 104.

The top lock tab washer 104a can comprise two tabs 126, the two tabs being a first tab 126a folded over a side edge 124 of the upper clevis 110 and a second tab 126b folded over a circumferential side 128 of the nut 114. The tabs 126 can be configured to prevent the washer 104a from rotating with respect to the upper clevis 110 and to prevent the securing nut 114 from rotating with respect to the washer 104a. The first tab 126a can also be called an edge tab 126a, and the second tab 126b can also be called a nut tab 126b. In addition, the pipe 102 can prevent the upper clevis 110 and the hanger 100 from rotating with respect to the threaded rod 106. As such, the top lock tab washer 104a can prevent the securing nut 114 from loosening, and from releasing the pipe 102 and the clevis hanger 100 from the rod 106. The washer 104a can therefore provide vibration resistance to the hanger 100.

The hanger 100 can further comprise a lower clevis 116 that is configured to hold the pipe 102. The lower clevis 116 that holds the pipe 102 can be a U-shaped strap and can, for example and without limitation, be stamped from sheet metal. In combination, the upper clevis 110 and the lower clevis 116 can define a suspension member 136. In some aspects, the lower clevis 116 and the upper clevis 110 can be monolithic with each other such that the devises 116,110 define a single suspension member 136 formed from one piece of material, such as cast iron, for example and without limitation. In other aspects, the suspension member 136 can comprise one or more parts and can be similar to other pipe hangers currently on the market and can be any assembly of parts configured to attach a pipe 102 to a threaded rod 106. The lower clevis 116 can attach to the upper clevis 110 by a bolt 120, which can also be called a threaded rod 120. Each of the devises 110,116 can comprise two flattened ends 138, each flattened end 138 defining a hole through which the bolt 120 can be inserted. Specifically, the bolt 120 can be inserted into a first side hole (hidden behind the lower clevis 116) in the upper clevis 110, a first side hole 130 in the lower clevis 116, a second side hole (hidden behind the upper clevis 110) in the lower clevis 116, and a second side hole (hidden behind a side nut 118) in the upper clevis 110, in order from left to right with respect to the viewing angle of FIG. 1. The bolt 120 can be secured on the hanger 100 by the side nut 118, such as a hexagonal (hex) nut. A side lock tab washer 104b can be disposed on the bolt 120 between the upper clevis 110 and the nut 118. The bolt 120 can, for example and without limitation, be threaded only partially on a tail-most 132 end of the bolt 120.

The side lock tab washer 104b can comprise tabs 126 that prevent the nut 118 from rotating on the bolt 120, similar to the top lock tab washer 104a. In the current aspect, the tabs 126 can comprise a first tab 126a and a second tab 126b, similar to the top lock tab washer 104a. The first tab 126a can fold over the side edge 124 of the upper clevis 110 and a side edge 122 of the lower clevis 116, preventing the washer 104b from rotating. The second tab 126b can fold over the side 128 of the nut 118, preventing the nut 118 from rotating with respect to the hanger 100.

The lock tab washer 104 can provide several functions in one unit. It can prevent the nuts 114,118 from loosening due to vibrations, particularly when the hangers 100 are supporting overhead pipes 102. Vibrations can be transmitted through the pipes 102 or from the floor above. It may be inconvenient or difficult to check the tightness of fasteners (such as the nuts 118) when the hangers 100 are high above typical human reach and often hidden behind ceiling tiles or drywall ceilings. In addition, the washers 104 can be configured to be visible from a location far below the hanger 100, thereby allowing personnel to identify which components are vibration-resistant by visual inspection while standing on the floor, such as during construction and shortly after the hangers 100 are installed. The washers 104 can be sized and colored to provide visibility. For example, bright colors and high reflectivity materials can be used.

The washers 104 can be carbon steel or any suitable material known in the art, and they can be covered with a layer to provide corrosion-resistance as well as to increase visibility. For example, the washers can be pre-galvanized or zinc-electroplated. They can be coated in yellow or purple chromate, painted orange, or covered or dipped in plastisol, rubber, or epoxy, for example and without limitation.

Figure 2A:
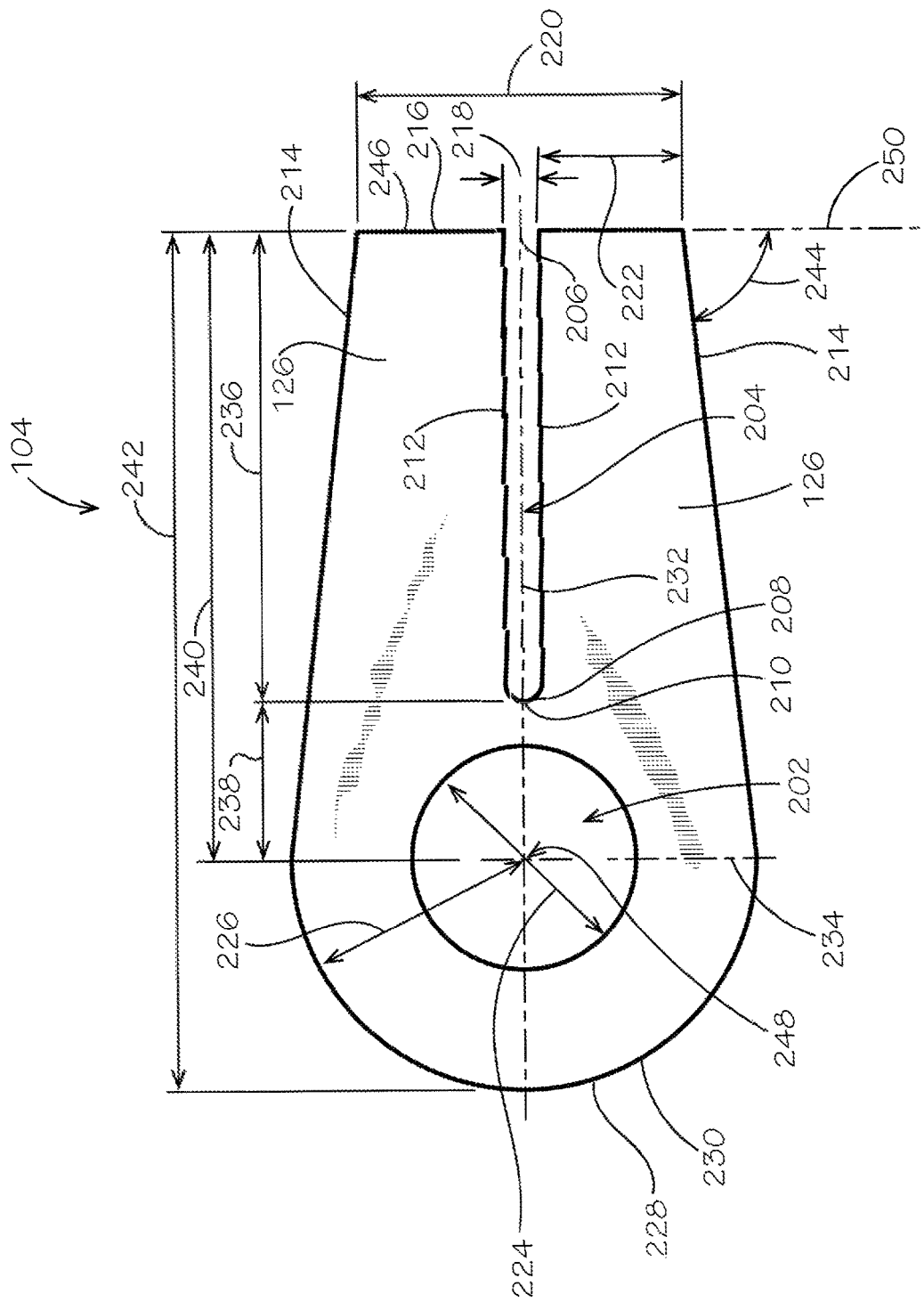
FIG. 2A is a top view of the lock tab washer of FIG. 1, in a flat configuration.

FIG. 2A is a top view of the lock tab washer 104 of FIG. 1 in a flat configuration, according to one aspect of the current disclosure. In the present aspect, the washer 104 can define a circular washer hole 202 at a first end 230 of the washer 104 and a slit 204 at a second end 216 of the washer 104 opposite the first end 230. The slit 204 can separate the tabs 126 of the washer 104. The slit 204 can define an open end 206 at the second end 216 and a closed end 208 proximate the hole 202. The closed end can define a curvilinear edge 210 such as a half circle. The slit 204 and the hole 202 can be separated by washer material, such that the hole 202 and the slit 204 are noncontiguous spaces. The slit 204 can define a width 218 that is less than, for example, one-fourth a diameter 224 of the circular hole 202. The slit 204 can also define a length 236.

The first end 230 of the washer 104 can define a curvilinear edge 228, such as a half circle sharing a same center 248 as the circular hole 202. The curvilinear edge 228 and the center 248 can define a radius 226 therebetween. The closed end 208 of the slit 204 and the center 248 of the hole 202 can define a distance 238 therebetween. The second end 216 and the center 248 can define a distance 240 therebetween. The washer 104 can define a washer length 242.

Each tab 126 can have an outer side edge 214 and an inner side edge 212, wherein each of the outer side edges 214 slope toward each other from the first end 230 to the second end 216. The second end 216 can define a straight edge 246. The outer side edge 214 of each respective tab 126 can define an outside angle 244 with a second end axis 250 defined by the straight edge 246. The washer 104 can be symmetric about a longitudinal axis 232 defined by the slit 204. The washer 104 can define a width axis 234 that is perpendicular to the longitudinal axis 232 and runs through the center 248 of the hole 202. The second end 216 can define a width 220, and a width 222 of the tab 126 at the second end 216 can also be defined.

Figure 2B:
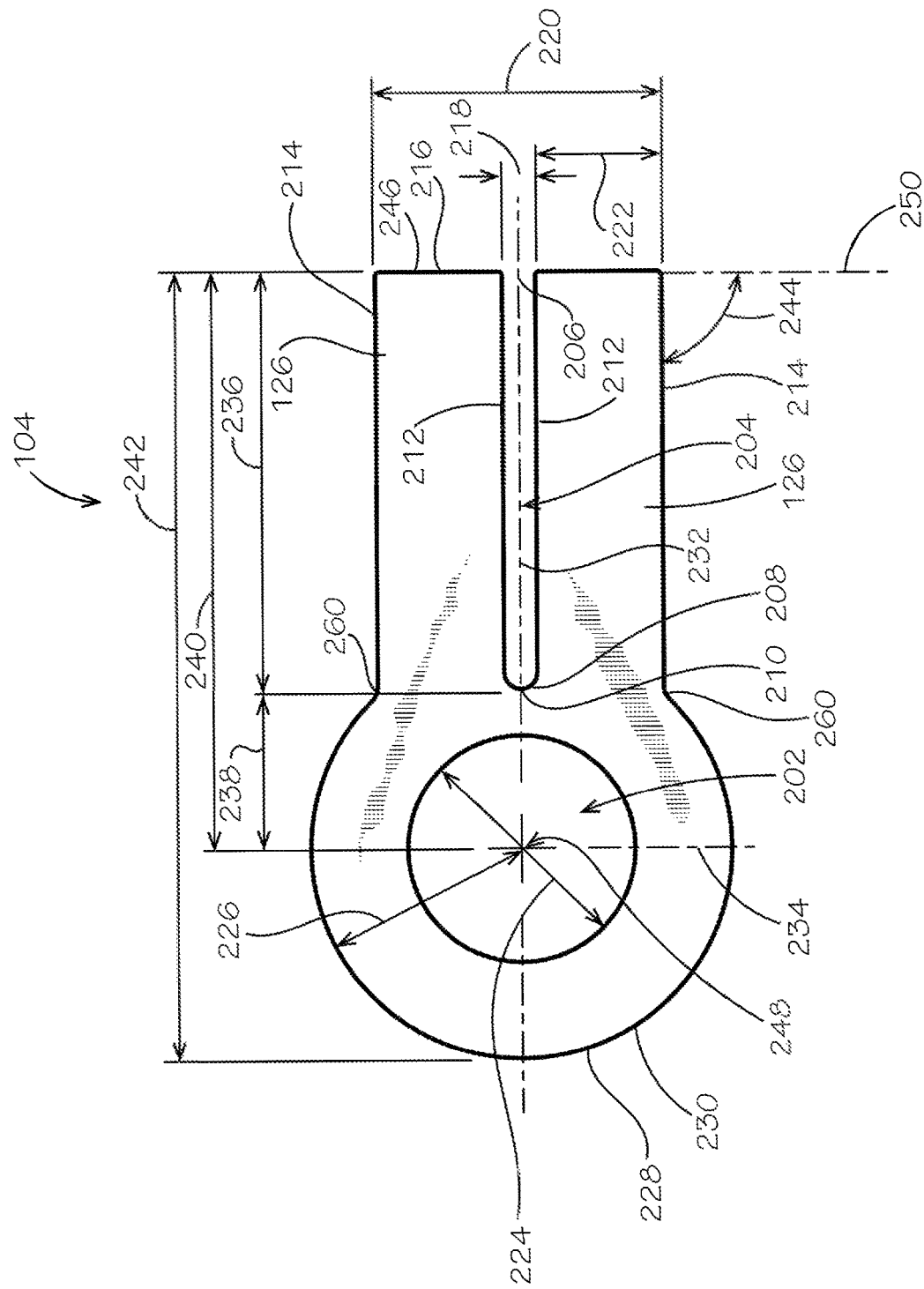
FIG. 2B is a top view of the lock tab washer, in a flat configuration and according to another aspect of the present disclosure.

FIG. 2B is a top view of the lock tab washer 104 in a flat configuration, according to another aspect of the present disclosure. The curvilinear edge 228 at the first end 230 can be a circle that is concentric with the hole 202. The circular curvilinear edge 228 can meet the tabs 126 at one or more inflection points 260. Additionally, the outside edges 214 of each respective tab 126 can be parallel to each other. Similar parts of FIG. 2A and FIG. 2B can have the same names and use the same designators.

Figure 3A:
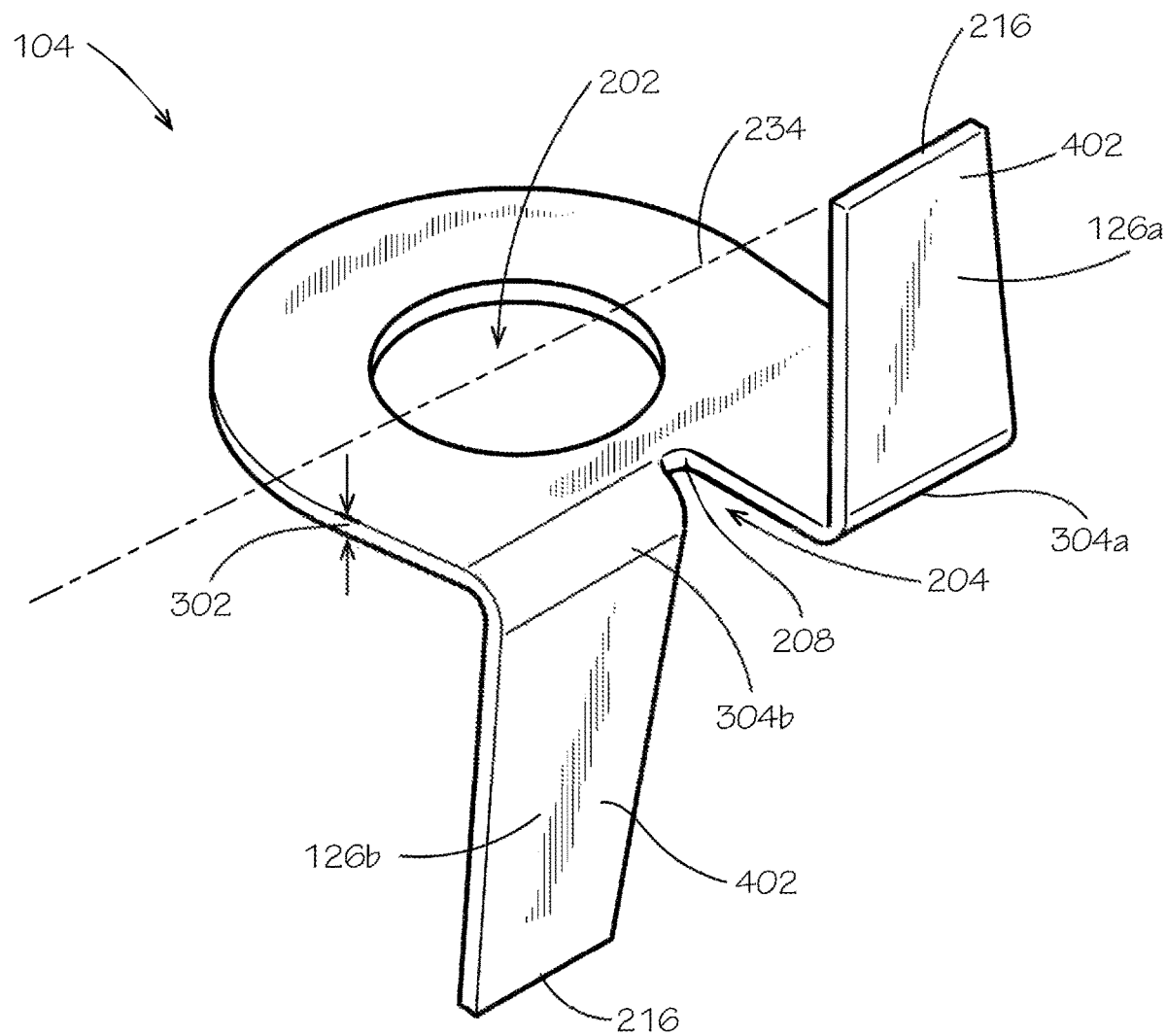
FIG. 3A is a perspective view of the lock tab washer of FIG. 2A, in a folded configuration.

FIG. 3A is a perspective view of the lock tab washer 104 in a folded, or a secured, configuration. The washer 104 can define a thickness 302. The first tab 126a can bend at a first bend line 304a between the closed end 208 and the open end 206 of the slit 204 (as shown in FIG. 2A). In the current aspect, the first bend line 304a can be approximately one-third of the length 236 from the closed end 208 to the second end 216. The first tab 126a can be folded up in about a 90-degree angle. The second tab 126b can fold in a direction opposite the first tab 126a (down, in the current aspect) at a second bend line 304b proximate to the closed end 208 of the slit 204, relative to the first bend line 304a. In the current aspect, a bent section 402 of the first tab 126a of each washer 104 can be shorter than the bent section 402 of the second tab 126b. This can be due to the first bend line 304a being closer to the open end 206 (shown in FIG. 2A) of the slit 204. The fold lines 304a,b can run substantially parallel to the width axis 234 running through the hole 202. The washer 104 can be stamped from sheet metal, for example and without limitation.

Figure 3B:
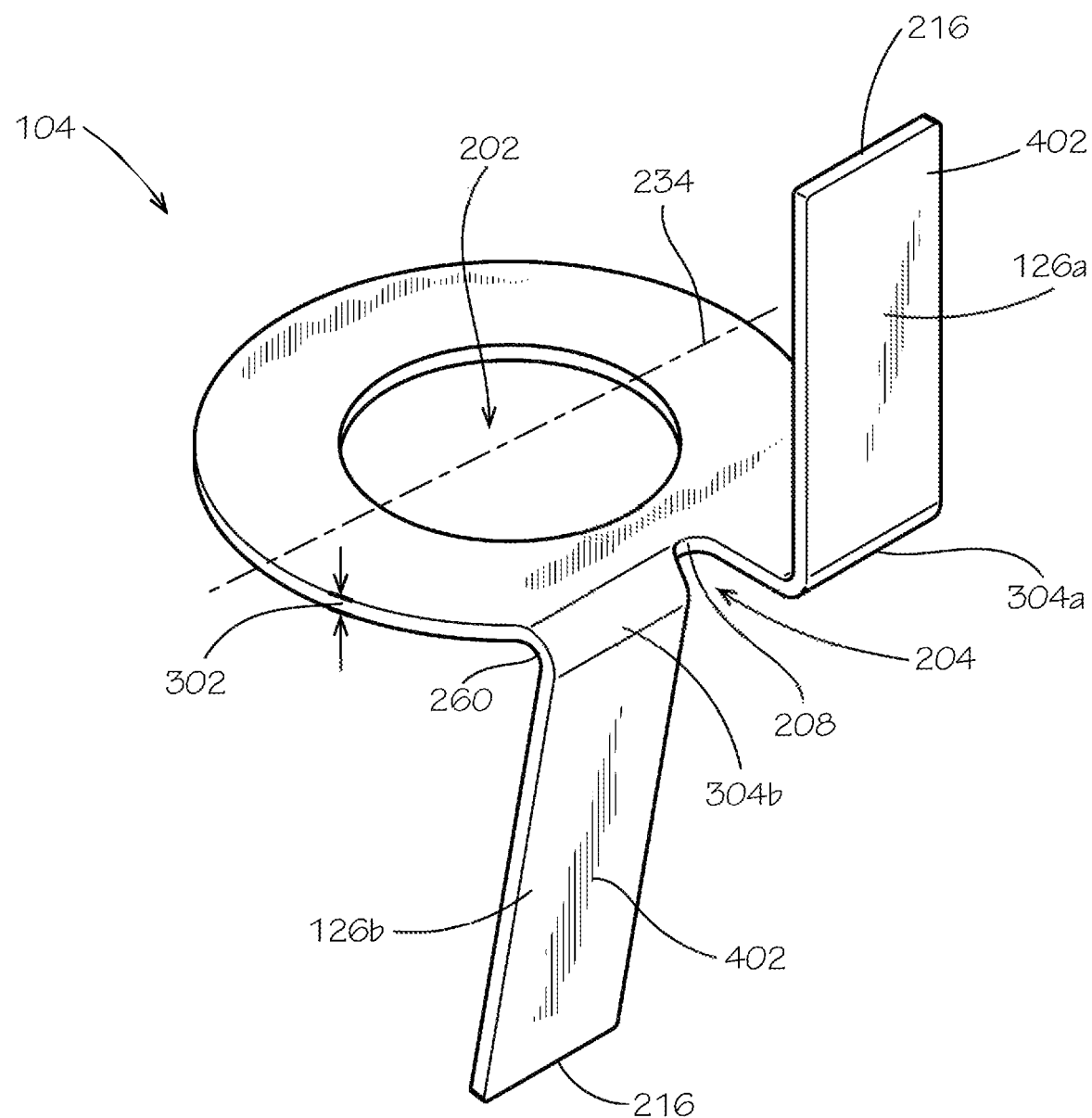
FIG. 3B is a perspective view of the lock tab washer of FIG. 2B, in a folded configuration.

FIG. 3B is a perspective view of the lock tab washer 104 of FIG. 2B in the folded configuration. One of the inflection points 260 can be seen in this view. Similar parts of FIG. 3A and FIG. 3B can have the same names and use the same designators.

Figure 4:
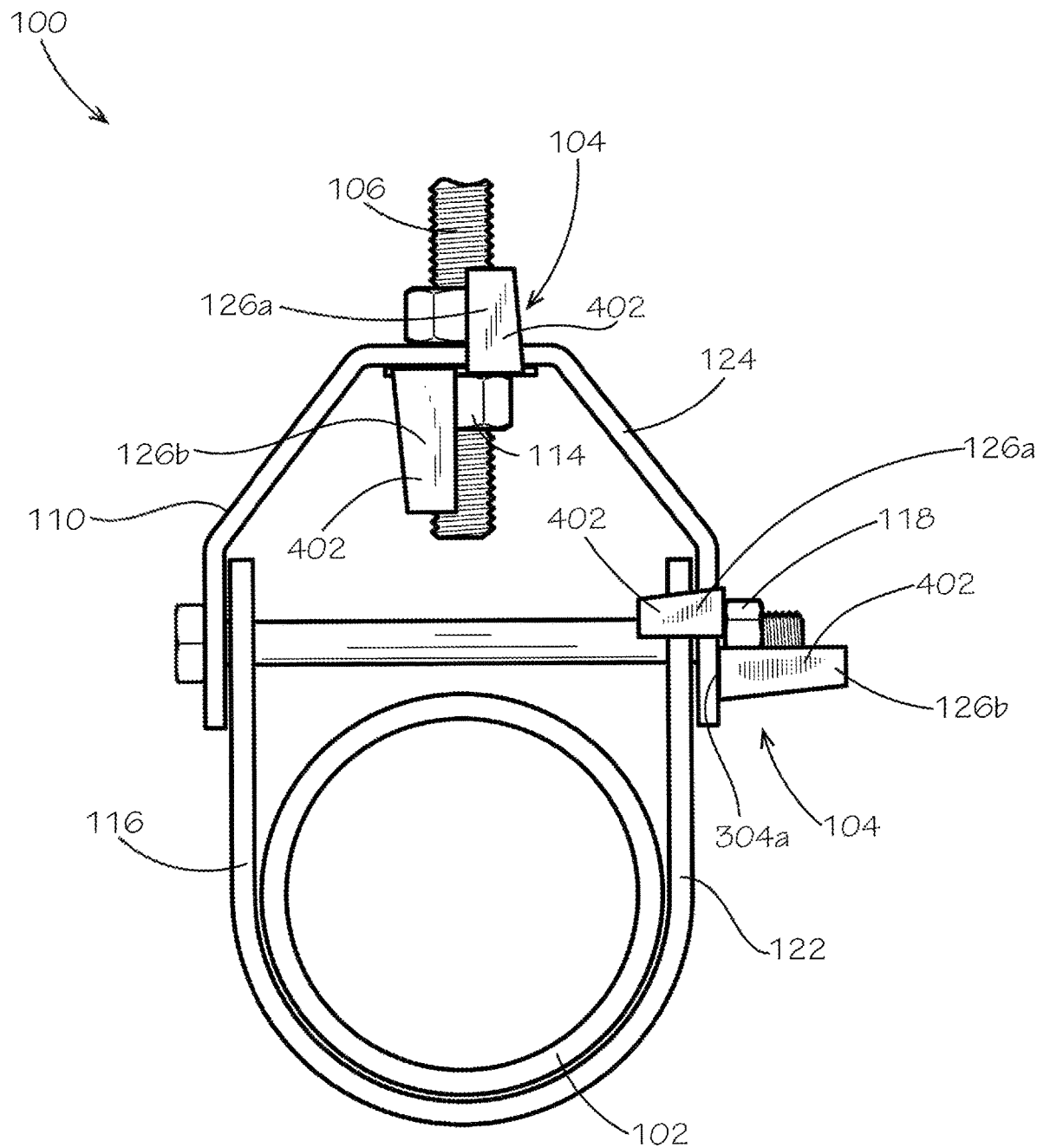
FIG. 4 is a front view of the hanger.

FIG. 4 shows a front (down the pipe 102) view of the hanger 100 in FIG. 1. As shown (also in FIG. 3A and FIG. 3B), the bent section 402 is shorter than the bent section 402 of the second tab 126b.

Figure 5:
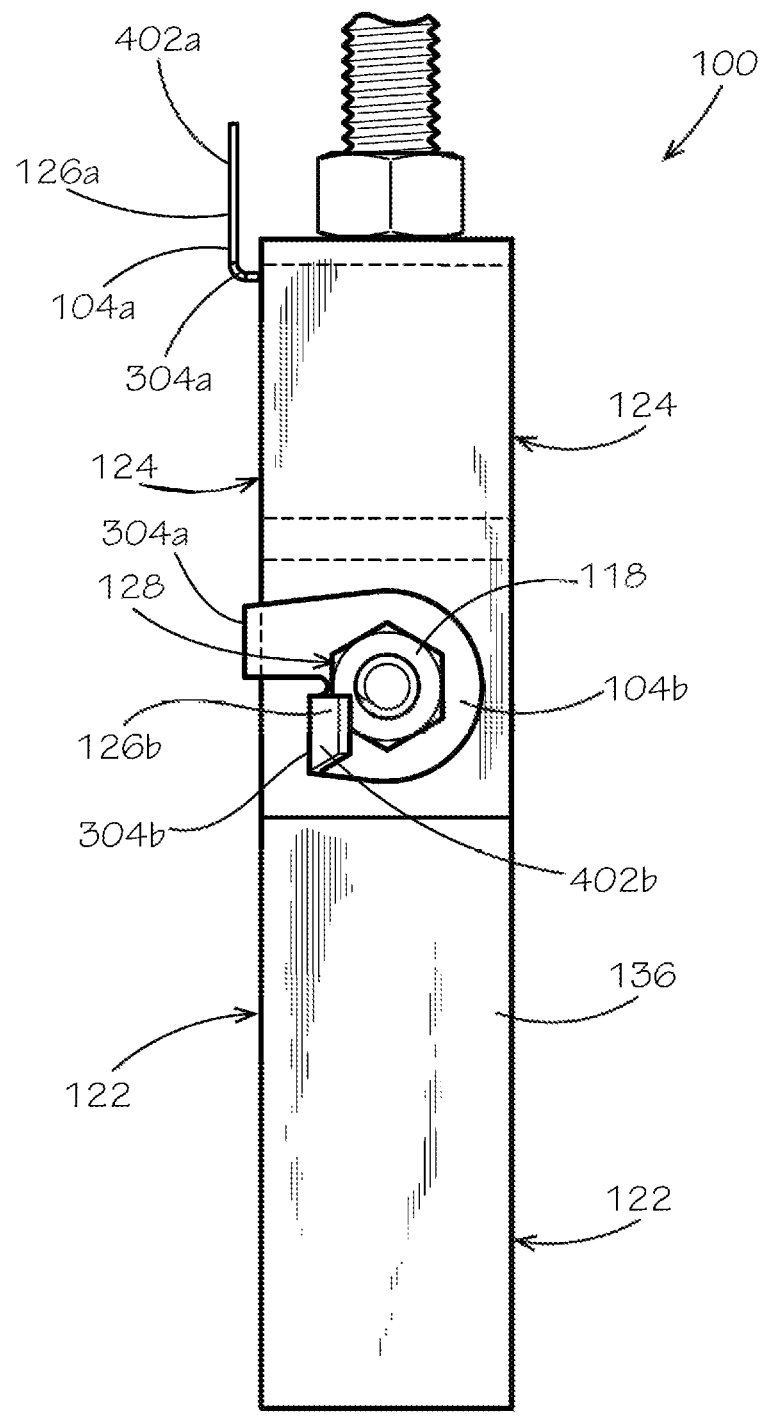
FIG. 5 is a side view of the hanger.

FIG. 5 shows a side view of the hanger 100. A second bent section 402b of the second tab 126b of the side lock tab washer 104b can contact the side 128 of the nut 118. The side edges 122,124 of the upper and lower devises 110,116 can be farther from the hole 202 (shown in FIG. 3A and FIG. 3B) of the washer 104 than the circumferential side 128 of the nuts 114,118. Thus, the bend lines 304a,b can be located differently on each respective tab 126.

As shown by the first tab 126a of the lock tab washer 104a, the first tabs 126a of each of the lock tab washers 104 can be bent at approximately 90-degrees, and a first bent section 402a may not contact the side edges 122, 124 of the suspension member 136. The first tabs 126a can fold over either of the two side edges 122, 124 of each clevis 110, 116. In other aspects, the user can bend the tabs 126 in various configurations such that the nut 118 is prevented from rotating with respect to the upper and lower devises 110, 116. For example, the bend lines 304a,b of the side lock tab washer 104b can contact the upper clevis 110 or the nut 118, allowing less space for slippage.

Figure 6:
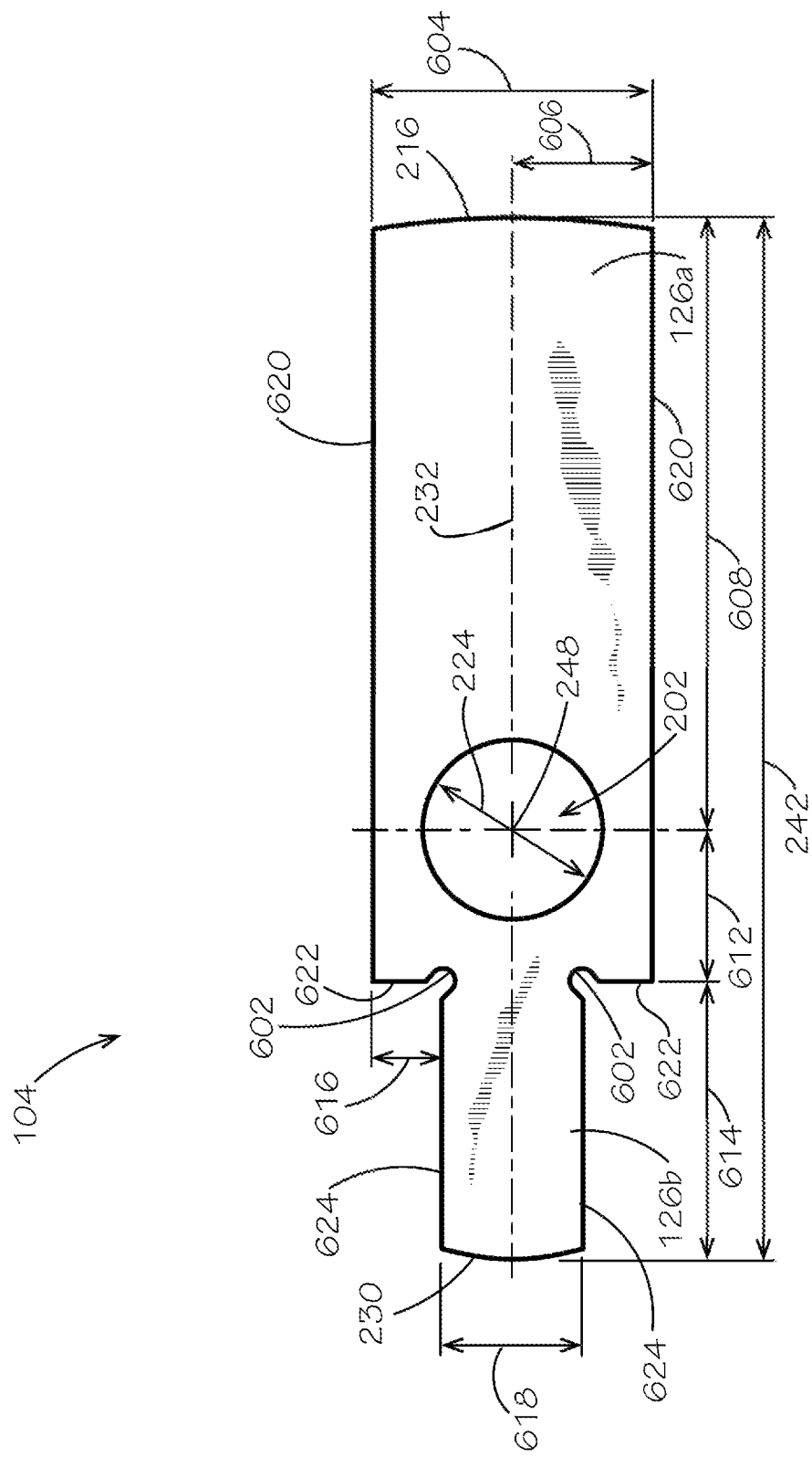
FIG. 6 is a top view of the lock tab washer in accordance with another aspect of the present disclosure.

FIG. 6 is a top view of the lock tab washer 104, in another aspect in accordance with the present disclosure. The first or the edge tab 126a can be distal from the second or the nut tab 126b across the washer hole 202 and can extend in an opposite direction from the washer hole 202. The hole 202 defines the hole diameter 224. In the present aspect, the nut tab 126b can be proximate the first end 230, and the edge tab 126a can be proximate the second end 216. The first and the second ends 230,216 can be curvilinear. The nut tab 126b can define a nut tab width 618 that is less than an edge tab width 604 of the edge tab 126a. The longitudinal axis 232 can define a plane of reflectional symmetry. The nut tab 126b can also comprise two nut tab side edges 624, each meeting a washer shoulder 622 at a relief notch 602 that can be recessed and curvilinear. Each shoulder 622 can join to a lateral edge 620 of the edge tab 126a. The nut tab 126b can also define a nut tab length 614 that is shorter than half the washer length 242. Further lengths can be defined, such as a shoulder width 616, a distance 608 from the second end 216 to the hole center 248, a distance 612 from the shoulder 622 to the hole center 248, and a distance 606 from the longitudinal axis 232 to the lateral edge 620.

Figure 7:
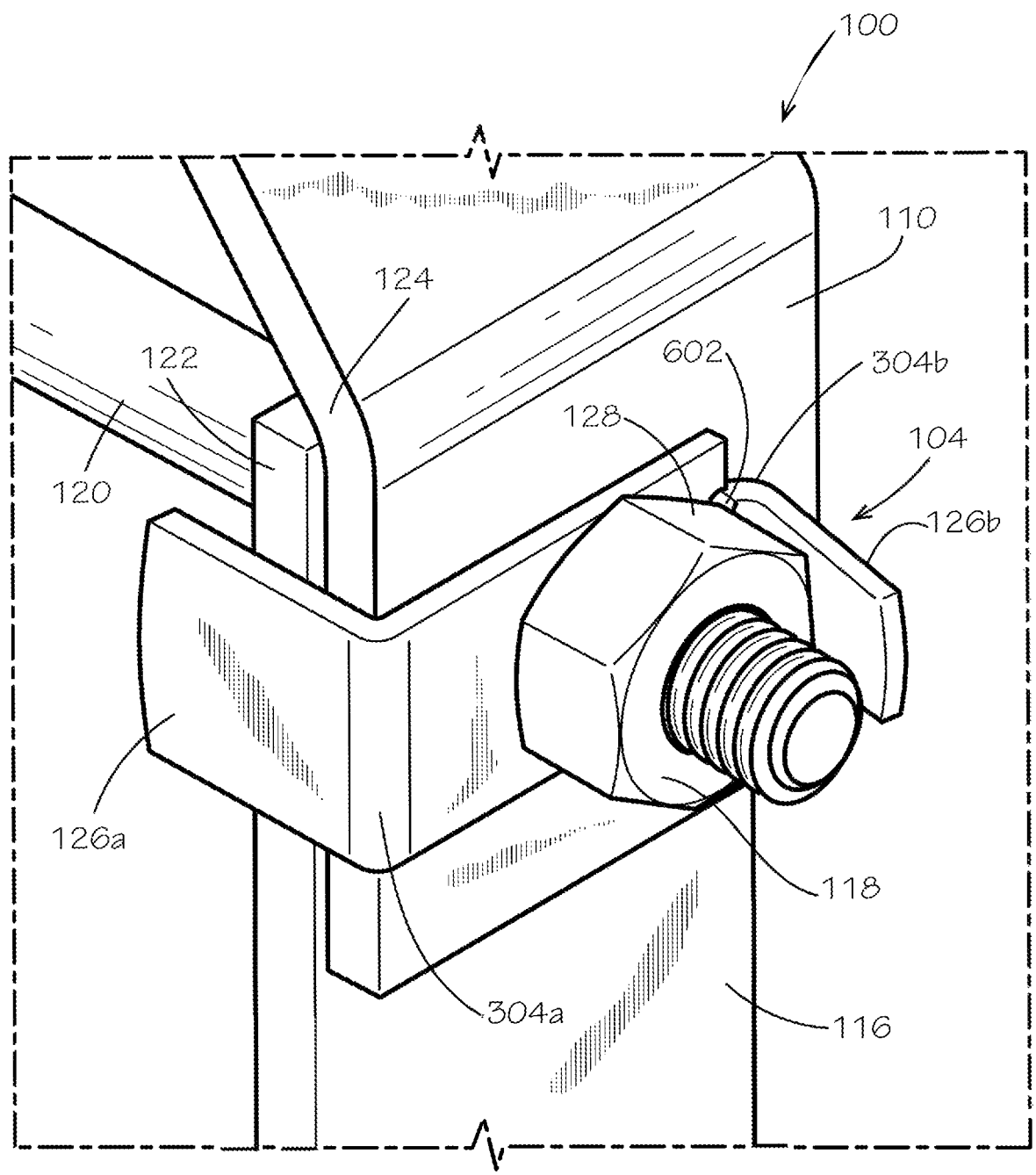
FIG. 7 is a detail view of the hanger assembled with the washer of FIG. 6.

FIG. 7 is a detail view of the hanger 100 assembled with the washer 104 of FIG. 6 in the location of washer 104b of FIG. 1. The washer 104 can be placed on the bolt 120 outside and adjacent the upper clevis 110, and the side nut 118 can be threaded on the bolt 120 over the washer 104. The edge tab 126a can fold at the first bend line 304a (which can also be called the edge bend line 304a) over the side edges 124, 122 of the upper and lower devises 110, 116, respectively. The nut tab 126b can fold at the second bend line 304b (which can also be called the nut bend line 304b) over the circumferential side 128 of the nut 118. The relief notches 602 can relief to the washer 104 at the nut bend line 304b, such that the washer 104 is less likely to rip or tear.

Figure 8:
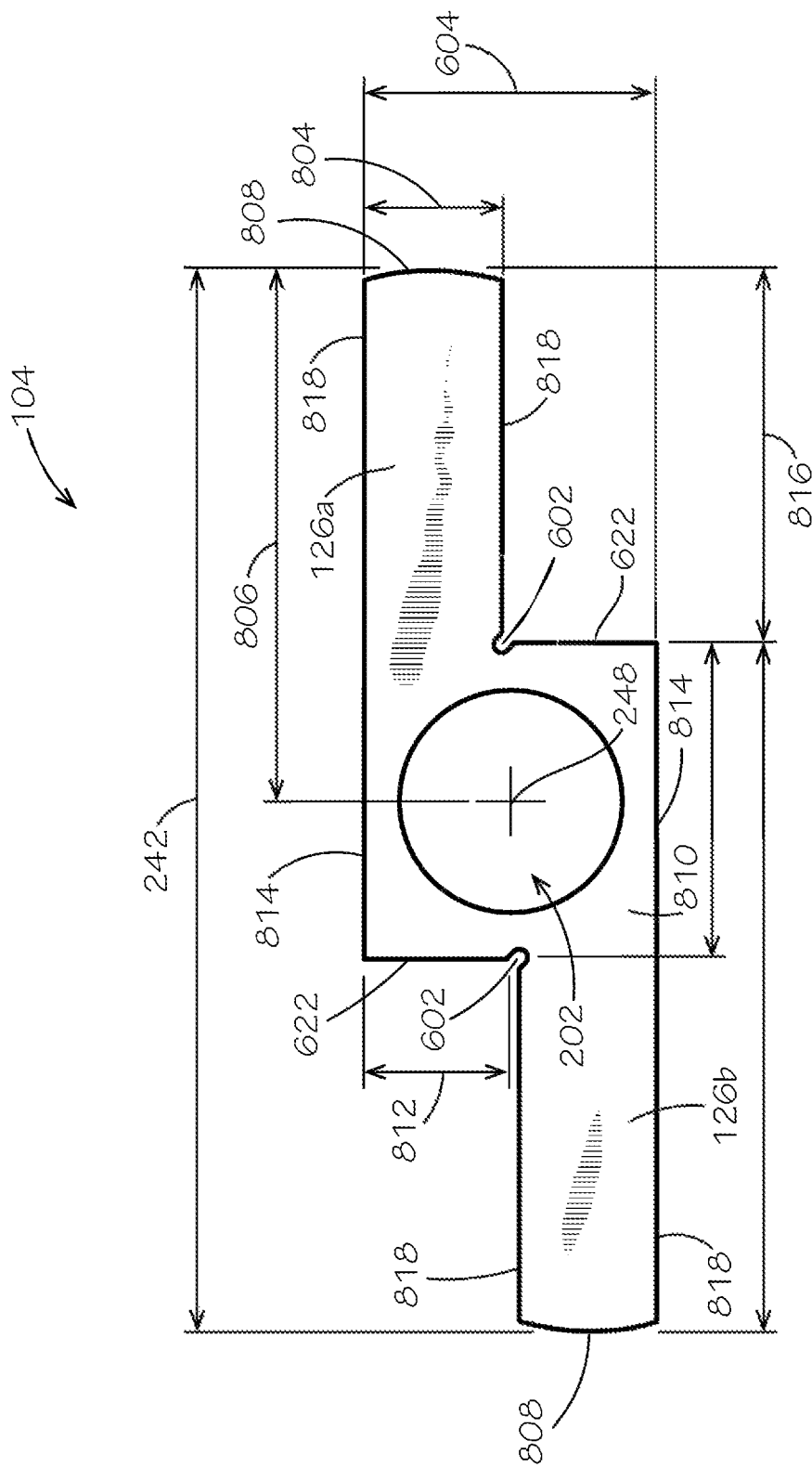
FIG. 8 is a top view of the lock tab washer in accordance with another aspect of the present disclosure.

FIG. 8 is a top view of the lock tab washer 104, in accordance with another aspect of the present disclosure. In the present aspect, the edge tab 126a and the nut tab 126b can be on opposing sides of the washer hole 202 and can extend in opposite directions that are offset but parallel. The tabs 126a,b can be approximately the same size and shape, and they can extend from a central portion 810 defining the washer hole 202. The washer 104 can have a 180-degree rotation symmetry about the hole center 248. The tabs can comprise tab ends 808 that are curvilinear. The tabs 126a,b can define tab lengths 816. The symmetric tabs can define a tab width 804. The hole center 248 and the tab end 808 can define a distance 806 therebetween. The central portion 810 can approximately be a square and can comprise two central lateral edges 814. A distance 812 between the hole center 248 and each central lateral edge 814 can be defined. The central portion 810 can also comprise two shoulders 622, each of which meet a tab lateral edge 818 at the relief notch 602.

Figure 9:
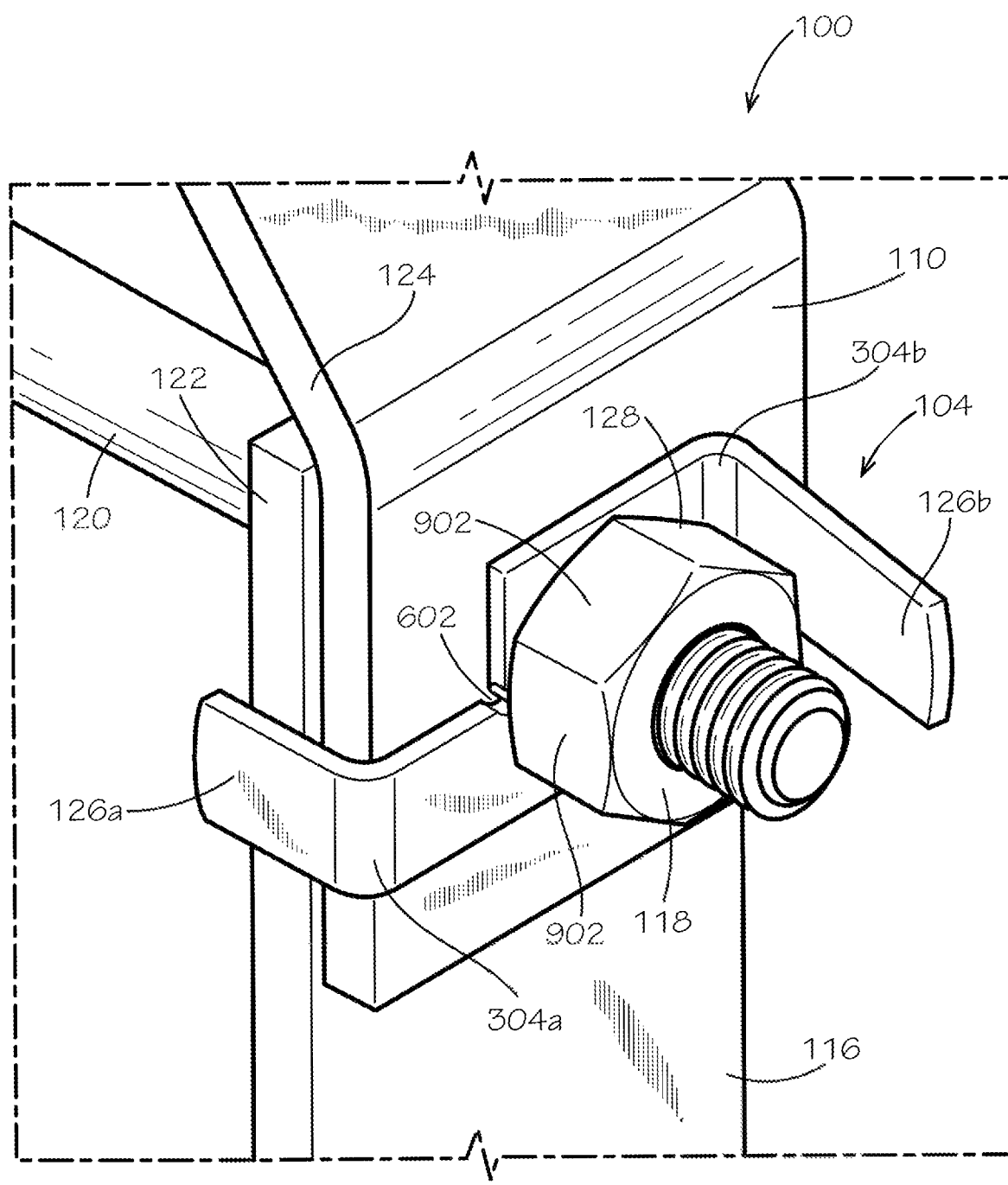
FIG. 9 is a detail view of the hanger assembled with the washer of FIG. 8.

FIG. 9 is a detail view of the hanger 100 assembled with the washer 104 of FIG. 8 in the location of washer 104b of FIG. 1. The placement of the washer 104 on the bolt 120 and the location of the bend lines 304a,b can be substantially the same as shown and described in FIG. 7. In the current aspect, either tab 126 can be the nut tab 126b, with the other tab 126 being the edge tab 126a. The circumferential side 128 of the nut 118 can form a polygon, such as a hexagon for the hex nut 114,118. Each edge of the polygon can define a side face 902 of the nut 114,118. For example, the hex nut 114,118 has six side faces 902. Each side face 902 can also be called a flat 902 of the circumferential side 128.

Because the nut tab 126b in the current aspect is offset to one lateral side of the washer 104, the nut tab 126b may contact only half of a side face 902. In comparison, the nut tab 126b in the aspect of FIG. 7, which fully covers one of the side faces 902, may provide for greater vibration resistance than the one shown in FIG. 9. The lock tab washer 104 of FIG. 9, however, may leave less unused material behind when it is stamped from a sheet, relative to the washer 104 of FIG. 7.

Figure 10:
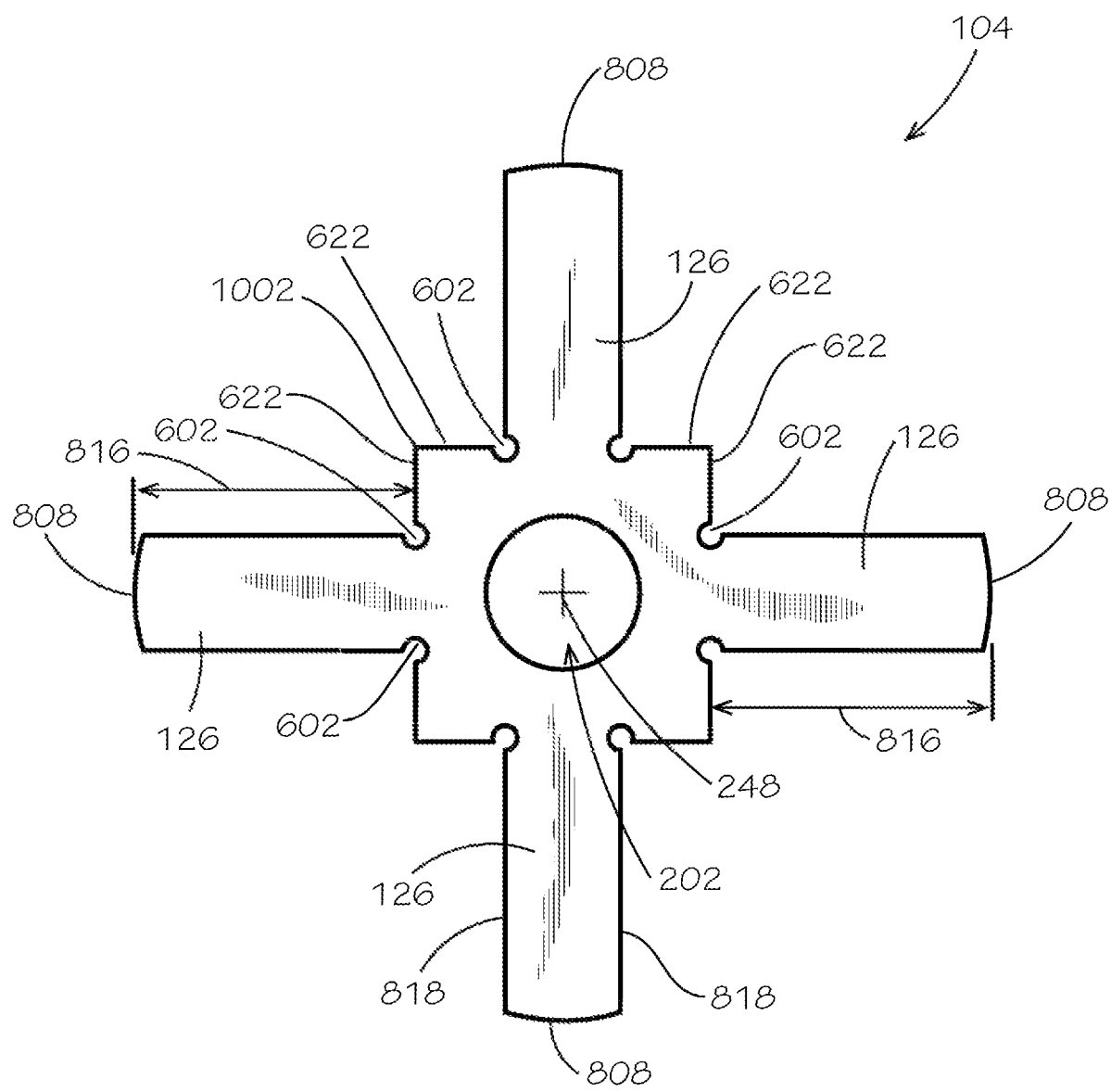
FIG. 10 is a top view of the lock tab washer in accordance with another aspect of the present disclosure.

FIG. 10 is a top view of the lock tab washer 104 in a flat configuration, in accordance with another aspect of the present disclosure. The washer 104 can comprise four tabs 126, each of which can have a substantially similar size and shape, such that any one of the tabs 126 can be an edge tab 126a (shown in FIG. 11) or a nut tab 126b (shown in FIG. 11). As such, the tab lengths 816 can be substantially the same. The washer can have 90-degree rotation symmetry about the hole center 248. The tab ends 808 can be curvilinear. The tab lateral edges 818 can each meet one of the shoulders 622 at one of the relief notches 602. The shoulders can meet at a shoulder corner 1002.

Figure 11:
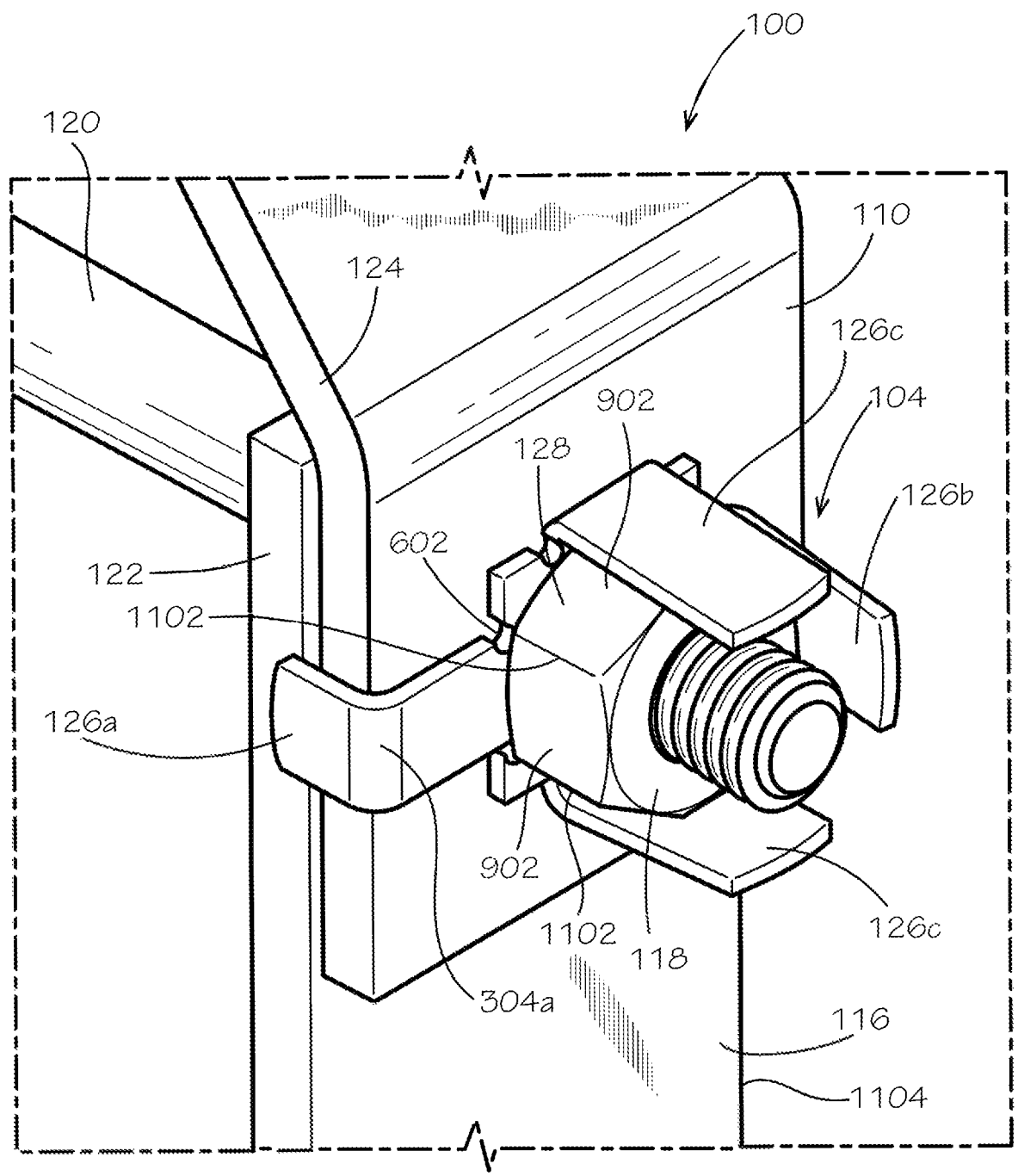
FIG. 11 is a detail view of the hanger assembled with the washer of FIG. 10.

FIG. 11 is a detail view of the hanger 100 assembled with the washer 104 of FIG. 10 in the location of washer 104b of FIG. 1. In the current aspect, one of the tabs 126 can be the edge tab 126a, and the tab 126 opposite the edge tab 126a can be the nut tab 126b. The remaining tabs 126 can be lateral tabs 126c that are configured to bend adjacent to the nut circumferential side 128 and provide greater vibration resistance. In the present aspect, when the nut 118 is a hex nut 118, the lateral tabs 126c may not contact a substantial portion of one of the nut's 118 side faces 902. In other aspects, the lateral tabs 126c can be bent obliquely, or bent to conform to the circumferential side 128 of the nut 118, such that greater contact is made with one of the side faces 902.

One advantage of the lock tab washer 104 in the aspect of FIG. 10 is that assembly can be less dependent on the orientation of the nut 118. As shown in FIG. 11, lateral tabs 126c align with points 1102, rather than the flats 902 of the hex nut 118. In another aspect (not shown), the nut 118 can be rotated slightly, and the tab acting as the nut tab 126b of FIG. 11 might align with one of the points 1102 of the nut 118. The lateral tabs 126c can then align with the flats 902. In that aspect, the lateral tabs 126c of FIG. 11 can also be the nut tabs 126b (aspect not shown). The tab acting as the nut tab 126b in FIG. 11 can then bend against the side edge 1104 opposite side edges 122, 124, such that two tabs 126 engage the devises 110, 116 and two tabs 126 engage a flat 902 of the nut 118.

Any of the washers 104 shown in FIGS. 6-11 can also be used as a top washer 104a on the upper clevis 110 adjacent to the securing nut 114. The presently disclosed lock tab washer 104 provides for several advantages over the currently-available solutions for vibration resistance. Personnel can see with the naked eye whether a lock tab washer 104 has been installed; they can also see when, for example, the edge tab 126a of the washer 104 has slipped past the side edge 124, 122 of the upper or lower devises 110, 116. Thus, personnel can easily identify when replacement of the washer 104 or retightening of the nut 108, 118 is necessary. Such advantages are particularly useful in the art of suspending pipes 102, since the pipes 102 may be located in areas that may not receive regular maintenance, and because the consequence of a falling pipe 102 due to a loose nut 114, 118 may be catastrophic. In addition, the lock tab washers 104 can provide for greater protection against intentional or unintentional removal of the nut 118 from the bolt 120, because the washers positively engage lateral side edges of each of the nuts 114, 118 and devises 110, 116.

The lock tab washer 104 can be used to suspend pipes 102 from ceilings as low as five feet or less (such as on submarines), to ceilings as high as 16 feet to 80 feet or more, as in some warehouses. The lock tab washer 104 can be sized with such definiteness as to allow visual inspection from the floor with the naked eye, for example. For some uses, the appropriate washer length 242 (such as for the aspect shown in FIG. 2A and FIG. 2B), may be 1.375 inches or less, or 2.875 inches or more. A larger washer 104 size may be more appropriate for uses in which the pipe 102 is suspended from a relatively high ceiling.

Further, in other aspects, the lock tab washer 104 of any of the previously described aspects can be used with any products, such as water and gas products, that utilize nuts 118 and bolts 120. In some aspects, for example and without limitation, the lock tab washer 104 can be used to hold a nut 118 onto a bolt 120 on a pipe coupling, a flanged connection between two pipe elements such as a valve and a pipe 102, pipe clamps, and seismic braces.

Figure 12:
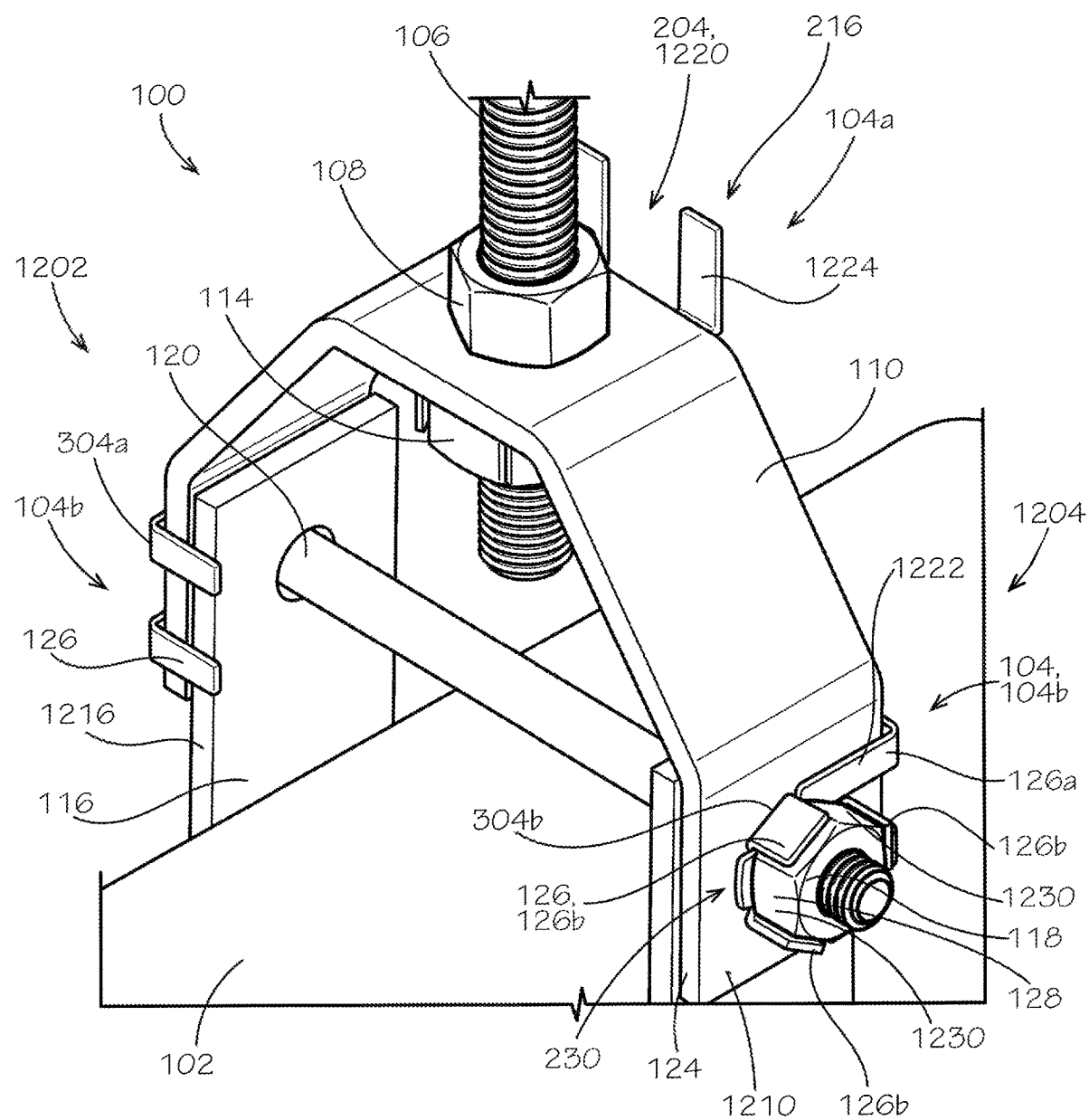
FIG. 12 is a perspective view of the hanger of FIG. 1 assembled with the lock tab washer, in accordance with another aspect of the present disclosure.

FIG. 12 is a perspective view of the pipe 102 hanging from the pipe hanger 100. The pipe hanger 100 can comprise one or more of the lock tab washers 104, in accordance with another aspect of the present disclosure. In the present aspect, the pipe hanger 100 can comprise three of the lock tab washers 104, such as the top lock tab washer 104a and two of the side lock tab washers 104b. As shown, the hanger 100 can comprise the top nut 108, the securing nut 114, and the upper clevis 110 disposed therebetween. The threaded rod 106 can extend through each of the top nut 108, securing nut 114, and upper clevis 110. The top lock tab washer 104a can be placed on the threaded rod 106 between the upper clevis 110 and the securing nut 114. Example aspects of the pipe hanger 100 can further comprise the lower clevis 116 and the bolt 120 (e.g., the threaded rod 120) for securing the lower clevis 116 to the upper clevis 110. The bolt 120 can extend through each of the upper and lower clevis 110, 116 at a first side 1202 of the pipe hanger 100 and at a second side 1204 of the pipe hanger 100. In the present aspect, the pipe hanger 100 can comprise one or more of the side nuts 118. Each of the side lock tab washers 104b can be disposed on the bolt 120 between the upper clevis 110 and a corresponding one of the side nuts 118 at either the first side 1202 or the second side 1204 of the pipe hanger 100.

In the present aspect, each of the lock tab washers 104 can generally define the first end 230 and the opposite second end 216. A washer body 1310 (shown in FIG. 13) of the lock tab washer 104 can be defined at or proximate to the first end 230 thereof, and the washer hole 202 (shown in FIG. 2A) can be formed through the washer body 1310. The washer hole 202 can be substantially circular in some aspects, but can define any other suitable shape in other aspects (such as, for example, a star polygon, as shown in FIGS. 19-23). Referring to the side lock tab washers 104b, the washer body 1310 can confront a front face 1210 of the upper clevis 110 and the bolt/threaded rod 120 can extend through the circular hole 202. A plurality of the tabs 126 can extend from the washer body 1310 of the lock tab washer 104, as shown. The tabs 126 can comprise one or more of the edge tabs 126a and one or more of the nut tabs 126b. For example, in the present aspects, two of the edge tabs 126a can extend from the washer body 1310. The edge tabs 126a can be oriented substantially parallel with one another and can define the slit 204 therebetween. The slit 204 can be widened in the present aspect as compared to the slit 204 shown in the aspects of FIGS. 1-3B to define a more substantial gap 1220. As shown, the edge tabs 126a can be elongated such that they can extend to the second end 216 of the lock tab washer 104. The edge tabs 126a can be bent in a first direction to fold over the side edge 124 of the upper clevis 110, as described above. For example, each of the edge tabs 126a can define a first section 1222 extending from the washer body 1310 and a second section 1224 distal from the washer body 1310, wherein the second section 1224 can be bent relative to the first section 1222 at the first bend line 304a. In the present aspect, the first section 1222 of each edge tab 126a can be substantially parallel with the washer body 1310 and the second section 1224 of each edge tab 126a can be bent at about 90° relative to the first section 1222. In some aspects, the length of the second sections 1224 of the edge tabs 126a may be such that the second sections 1224 can extend across both the side edge 124 of the upper clevis 110 and a side edge 1216 of the lower clevis 116, as shown.

In the present aspect, three of the nut tabs 126b can extend from the washer body 1310 and can be bent in a second direction substantially opposite the first direction to fold over the circumferential side 128 of the corresponding nut (e.g., the top nut 114 or one of the side nuts 118). According to example aspects, each of the nuts 114,118 can be hexagonal nuts, and the circumferential side 128 thereof can define six faces 1230. In the present aspect, the three nut tabs 126b can be equally spaced from one another about the washer body 1310 of the lock tab washer 104, such that the nut tabs 126b do not fold over and confront adjacent faces 1230 of the circumferential side 128 of the nut 114,118. Rather, the nut tabs 126b can fold over and confront alternating faces 1230 of the circumferential side 128 at a plurality of the second bend lines 304b. Furthermore, as shown, a first one of the nut tabs 126b can extend from the washer body 1310 into the gap 1220, between the two edge tabs 126a. The remaining two nut tabs 126b can extend from the washer body 1310 nearer to the first end 230 of the lock tab washer 104. According to example aspects, the edge tabs 126a can be configured to prevent the lock tab washers 104 from rotating with respect to the upper clevis 110, and the nut tabs 126b can be configured to prevent the corresponding nuts 114,118 from rotating with respect to the lock tab washer 104.

Figure 13:
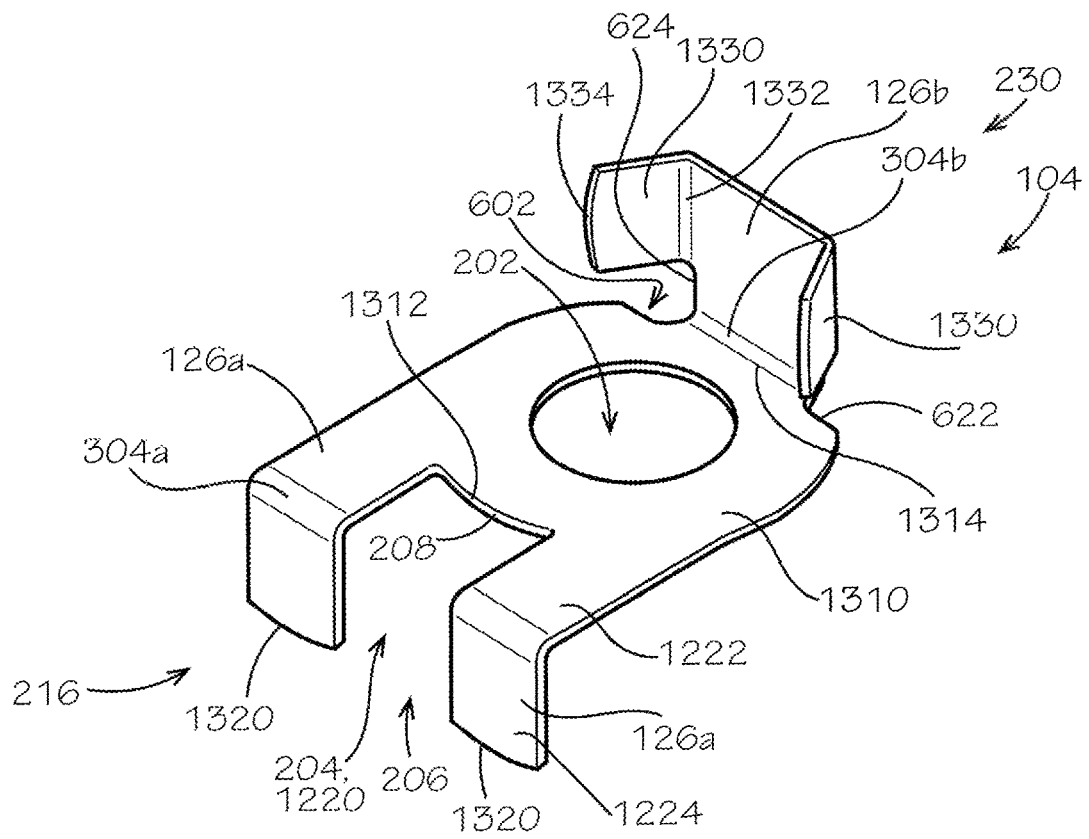
FIG. 13 is a front perspective view of the lock tab washer according to another aspect of the present disclosure.

FIG. 13 illustrates the lock tab washer 104 according to another example aspect of the present disclosure. As shown, the lock tab washer 104 can define the washer body 1310 and the circular hole 202 can be formed therethrough. Like the lock tab washers 104 shown in FIG. 12, the lock tab washer 104 of the present aspect can comprise two of the edge tabs 126a extending from a first side 1312 of the washer body 1310 generally towards the second end 216 of the lock tab washer 104. The edge tabs 126a can be oriented substantially parallel with one another, and the slit 204 can be defined therebetween. In the present aspect, the slit 204 can define the wider gap 1220. As shown, each of the edge tabs 126a can define the first section 1222 and the second section 1224, and the second section 1224 can be bent at a corresponding one of the first bend lines 304a relative to the first section 1222. The first bend line 304a can be defined between the closed end 208 and the open end 206 of the slit 204 (i.e., between the washer body 1310 and the second end 216 of the lock tab washer 104). The second sections 1224 of the edge tabs 126a can be bent in the first direction, which can be a substantially downward direction relative to the orientation shown. In example aspects, each of second sections 1224 can be bent at about a 90° angle, and each of the corresponding first bend lines 304a can be positioned at a location along a length of the corresponding edge tab 126a. In some aspects, distal ends 1320 of the edge tabs 126a can be curved, as shown.

The lock tab washer 104 of the present aspect can also comprise a singular nut tab 126b extending from a second side 1314 of the washer body 1310 generally towards the first end 230 of the lock tab washer 104. The singular nut tab 126b of the present aspect can be substantially similar in size and shape to the nut tabs 126b shown in FIG. 12. The second side 1314 of the washer body 1310 can be substantially opposite the first side 1312 of the washer body 1310. The nut tab 126b can be bent relative to the washer body 1310 at a corresponding one of the second bend lines 304b. The nut tab 126b can be bent in the second direction, which can be a substantially upward direction relative to the orientation shown. In example aspects, the nut tab 126b can be bent at about a 90° angle relative to the washer body 1310. The second bend line 304b can be oriented at the junction between the washer body 1310 and the nut tab 126b, as shown, or may be oriented at any other suitable location along the nut tab 126b or the washer body 1310. As described above, the nut tab side edges 624 of the nut tab 126b can each meet the washer shoulder 622 of the washer body 1310, and in some aspects, relief notches 602 can be formed in the washer shoulder 622 adjacent to where the nut tab side edges 624 meet the washer body 1310. Other aspects may not comprise the washer shoulder 622 and/or the relief notches 602. In some aspects, the lock tab washers 104 of FIG. 12 can also comprise relief notches 602 formed in the washer body 1310 proximate to some or all of the nut tabs 126b. Moreover, in contrast to the lock tab washers 104 shown in FIG. 12, the lock tab washer 104 of the present aspect can define a wing 1330 extending from each of the nut tab side edges 624. The wings 1330 can be bent relative to the nut tab 126b, as shown, at corresponding wing bend lines 1332. In some aspects, each of the wings 1330 can be bent relative to the nut tab 126b at about a 120° angle. In other aspects, the wings 1330 can be bent at any other suitable angle relative to the nut tab 126b. When the lock tab washer 104 is assembled with the pipe hanger 100 (shown in FIG. 12), the nut tab 126b can be configured to fold over and confront a first one of the faces 1230 (shown in FIG. 12) of the circumferential side 128 of the corresponding nut 114,118, as described above, and each of the wings 1330 can be configured to fold over and confront second and third ones of the faces 1230, each of which can be adjacent to the first one of the faces 1320. In some aspects, distal ends 1334 of the wings 1330 can be curved, as shown.

As such, according to example aspects, a method of assembling the pipe hanger 100 can comprise inserting the threaded rod 120 (shown in FIG. 12) through the suspension member 136 (shown in FIG. 12) and placing the lock tab washer 104 on the threaded rod 120. The lock tab washer 104 can define the edge tab 126*a*, the nut tab 126*b*, and at least one of the wings 1330 extending from the nut tab 126*b*. The method can further comprise threading the corresponding nut 114,118 on the threaded rod 120, wherein the nut 114,118 can define the circumferential side 128 (shown in FIG. 12) defining a first one of the face 1230 and a second one of the faces 1230 (faces 1230 shown in FIG. 12). The lock tab washer 104 can be oriented between the suspension member 136 and the nut 114,118. Example aspects of the method can further comprise folding the edge tab 126*a* over the side edge of the suspension member 136 (such as the side edge 124 of the upper clevis 110, both shown in FIG. 12), folding the nut tab 126*b* over the first one of the faces 1230 of the circumferential side 128 of the nut 114,118, and folding the wing 1330 over the second one of the faces 1230 of the circumferential side 128 of the nut 114,118.

Figure 14:
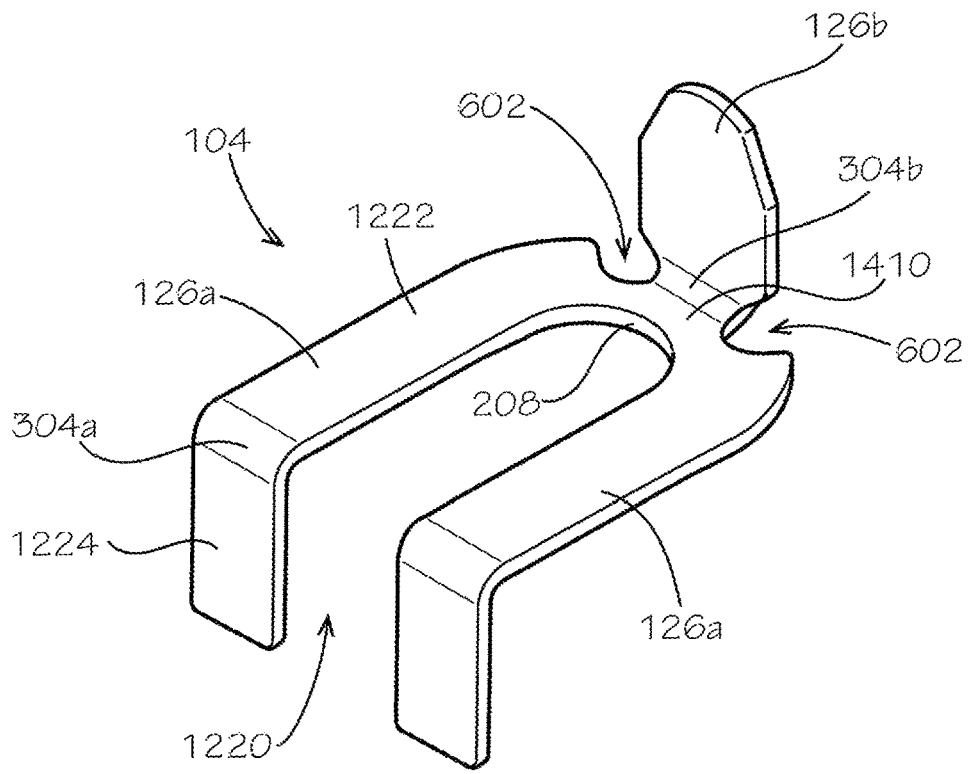
FIG. 14 is a front perspective view of the lock tab washer according to another aspect of the present disclosure.

FIG. 14 illustrates the lock tab washer 104 according to another example aspect of the present disclosure. The lock tab washer 104 can comprise two of the edge tabs 126*a*, which can define the gap 1220 therebetween, and one of the nut tabs 126*b*. However, in the present aspect, the lock tab washer 104 does not define the washer body 1310 (shown in FIG. 13) and the circular hole 202 (shown in FIG. 13) formed therethrough. Rather, as shown, the edge tabs 126*a* and the gap 1220 can be extended towards the nut tab 126*b*. A bridge 1410 can connect the edge tabs 126*a* and can define the closed end 208 of the gap 1220. The closed end 208 of the gap 1220 can define a substantially semi-circular shape in the present aspect, and the threaded rod 120 (shown in FIG. 12) can be configured to extend through the gap 1220 at the closed end 208. The nut tab 126*b* can extend from the bridge 1410 joining the edge tabs 126*a* together, and can be bent relative to the bridge 1410 at the second bend line 304*b*. In the present aspect, the second bend line 304*b* can be formed generally at the junction between the nut tab 126*b* and the bridge 1410, and the bridge 1410 can define the relief notches 602 on opposing sides of the second bend line 304*b*.

Figure 15:
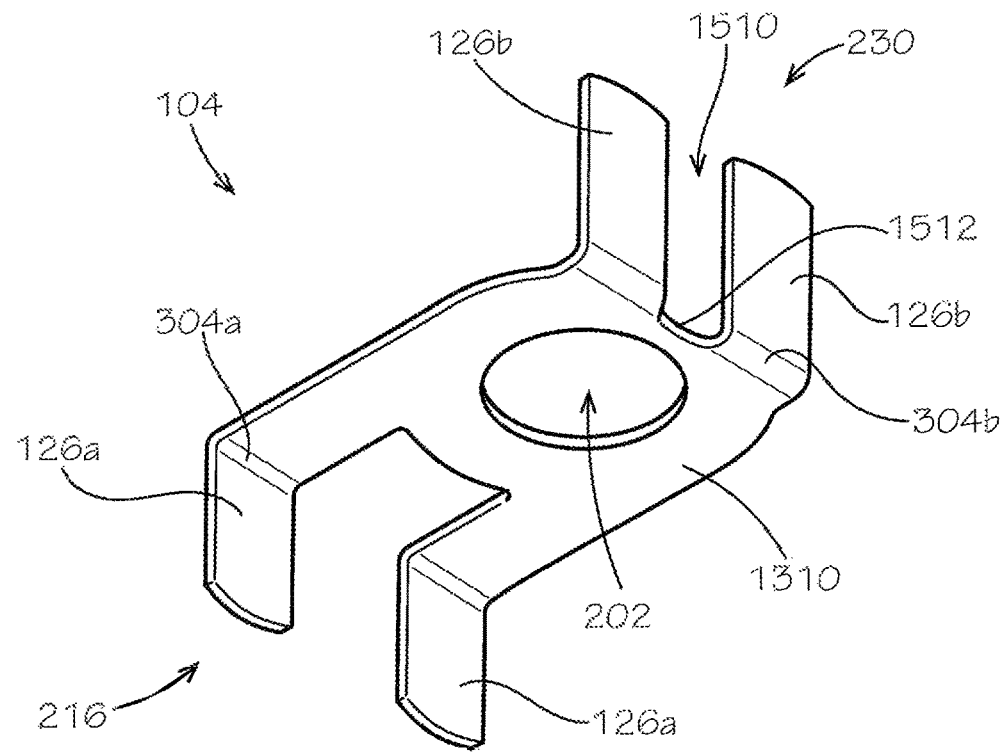
FIG. 15 is a front perspective view of the lock tab washer according to another aspect of the present disclosure.

Referring to FIG. 15, another example aspect of the lock tab washer 104 is illustrated. In the present aspect, the lock tab washer 104 can comprise the washer body 1310 and the two edge tabs 126*a* extending therefrom towards the second end 216 of the lock tab washer 104. The washer body 1310 can define the circular hole 202 therethrough, and each of the edge tabs 126*a* can be bent at a location along its length at a corresponding one of the first bend lines 304*a*. According to example aspects, the lock tab washer 104 can further define two of the nut tabs 126*b* extending from the washer body 1310 opposite the edge tabs 126*a* towards the first end 230 of the lock tab washer 104. Similar to the edge tabs 126*a*, the nut tabs 126*b* can be oriented substantially parallel to one another and can define a second gap 1510 therebetween. Each of the nut tabs 126*b* can be bent at the corresponding second bend lines 304*b* relative to the washer body 1310 at or near to the junction between the washer body 1310 and the nut tab 126*b*, which can be at or near a second closed end 1512 of the second gap 1510. In other aspects, the corresponding second bend lines 304*b* can be located at any other suitable location. The two nut tabs 126*b* can be configured to interact with the corresponding nut 114,118 (shown in FIG. 12) to prevent rotation of the nut 114,118 relative to the lock tab washer 104 when the nut 114,118 is in any configuration.

Figure 16:
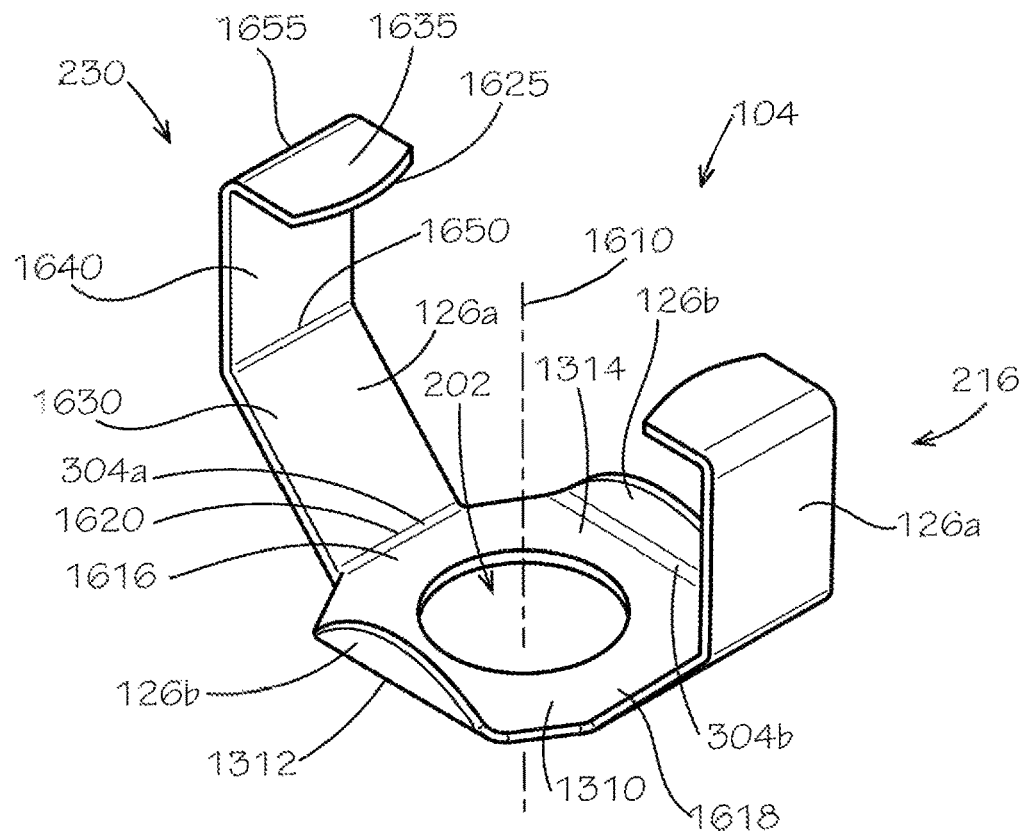
FIG. 16 is a rear perspective view of the lock tab washer according to another aspect of the present disclosure.

FIG. 16 illustrates another example aspect of the lock tab washer 104. In the present aspect, the lock tab washer 104 comprises the washer body 1310, which can define the circular hole 202 therethrough. An axis 1610 can extend through the circular hole 202. The lock tab washer 104 can further comprise a pair of opposing edge tabs 126*a* and a pair of opposing nut tabs 126*b*. A first one of the nut tabs 126*b* can extend from the first side 1312 of the washer body 1310, and a second one of the nut tabs 126*b* can extend from the opposite second side 1314 of the washer body 1310. Each of the nut tabs 126*b* can be bent relative to the washer body 1310 in the first direction at a corresponding one of the second bend lines 304*b*, as shown. In the present aspect, each of the nut tabs 126*b* can be bent relative to the washer body 1310 at about a 135° angle. In other aspects, the nut tabs 126*b* can be bent relative to the washer body 1310 at any other suitable angle.

A first one of the edge tabs 126*a* can extend from a third side 1616 of the washer body 1310 towards the first end 230 of the lock tab washer 104, and an opposite, second one of the edge tabs 126*a* can extend from an opposite fourth side 1618 of the washer body 1310 towards the second end 216 of the lock tab washer 104. In the present aspect, each edge tab 126*a* can define a first edge tab end 1620 and a second edge tab end 1625. Each edge tab 126*a* can further define a first portion 1630 extending from the first edge tab end 1620, a second portion 1635 extending from the second edge tab end 1625, and a middle portion 1640 between the first portion 1630 and the second portion 1635. According to example aspects, each of the edge tabs 126*a* can be bent relative to the washer body 1310 in the first direction at a corresponding one of the first bend lines 304*a* generally at or near the first edge tab end 1620. In the present aspect, each of the edge tabs 126*a* can be bent relative to the washer body 1310 at about a 135° angle. In other aspects, the edge tabs 126*a* can be bent relative to the washer body 1310 at any other suitable angle.

In example aspects, as shown, each of the edge tabs 126*a* can also be bent towards one another at a second edge bend line 1650 between the first portion 1630 and the middle portion 1640 thereof. In the present aspect, the middle portion 1640 can be bent relative to the first portion 1630 at about a 45° angle, such that the middle portion 1640 of each edge tab 126*a* can be about perpendicular to the washer body 1310 and about parallel to the axis 1610, as shown. In other aspects, however, the middle portion 1640 can be bent relative to the first portion 1630 at any other suitable angle. Moreover, in example aspects, each of the edge tabs 126*a* can additionally be bent towards one another at a third edge bend line 1655 between the middle portion 1640 and the second portion 1635 thereof. In the present aspect, the second portion 1635 can be bent relative to the middle portion 1640 at about a 90° angle, such that the second portion 1635 of each edge tab 126*a* can be about parallel to the washer body 1310 and perpendicular to the axis 1610, as shown. In other aspects, however, the second portion 1635 can be bent relative to the middle portion 1640 at any other suitable angle.

In instances wherein the lock tab washer 104 is the side lock tab washer 104*b* (shown in FIG. 12), when the lock tab washer 104 is assembled with the pipe hanger 100 (shown in FIG. 12), the corresponding nut 118 (shown in FIG. 12) can be received between the upper clevis 110 (shown in FIG. 12) and the lock tab washer 104. Each of the nut tabs 126*b* and edge tabs 126*a* can extend towards the upper clevis 110 to limit axial movement of the nut 118 therebetween. As described above, in the present aspect, the nut tabs 126*b* can be oriented at about a 135° angle relative to the washer body 1310. As such, the nut tabs 126*b* can be angled away from the circumferential side 128 (shown in FIG. 12) of the nut 118, such that they do not confront the circumferential side 128, and the nut 118 can be allowed to rotate on the threaded rod 120 (shown in FIG. 12). In other aspects, the nut tabs 126*b* can be angled such that the circumferential side 128 of the nut 118 to limit rotation of the nut 118. In the current aspect, the first portion 1630 of each edge tab 126*a* can also be oriented at about a 135° angle relative to the washer body 1310, as described above, such that the edge tabs 126*a* also do not interfere with rotation of the nut 118 on the threaded rod 120. According to example aspects, the middle portions 1640 of the edge tabs 126*a* can extend across the corresponding side edges 124,1216 of the upper clevis 110 and the lower clevis 116 and the second portions 1635 of the edge tabs 126*a* can wrap around the lower clevis 116 to confront a rear face 2360 (shown in FIG. 23) of the lower clevis 116. In instances wherein the lock tab washer 104 is the top lock tab washer 104*a* (shown in FIG. 12), the second portion 1635 of the edge tabs 126*a* do not wrap about the lower clevis 116, but rather can wrap about the front face 1210 (shown in FIG. 12) of the upper clevis 110.

Figure 17:
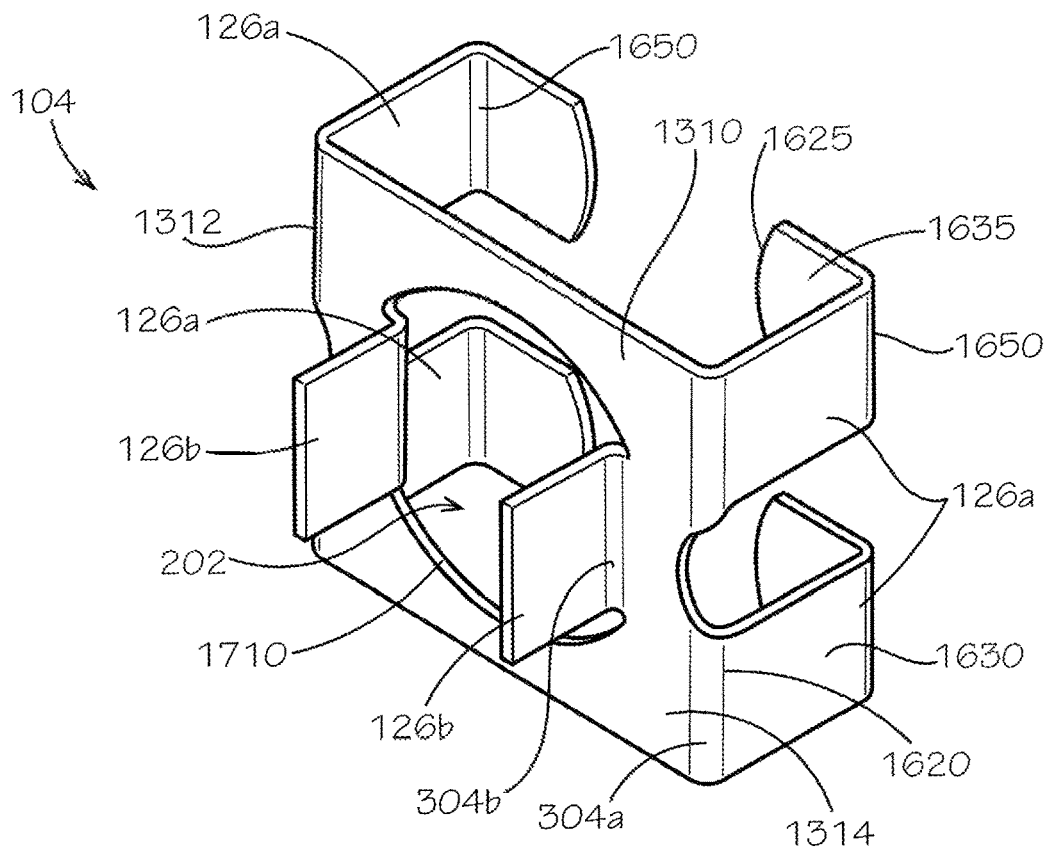
FIG. 17 is a front perspective view of the lock tab washer according to another aspect of the present disclosure.
Figure 18:
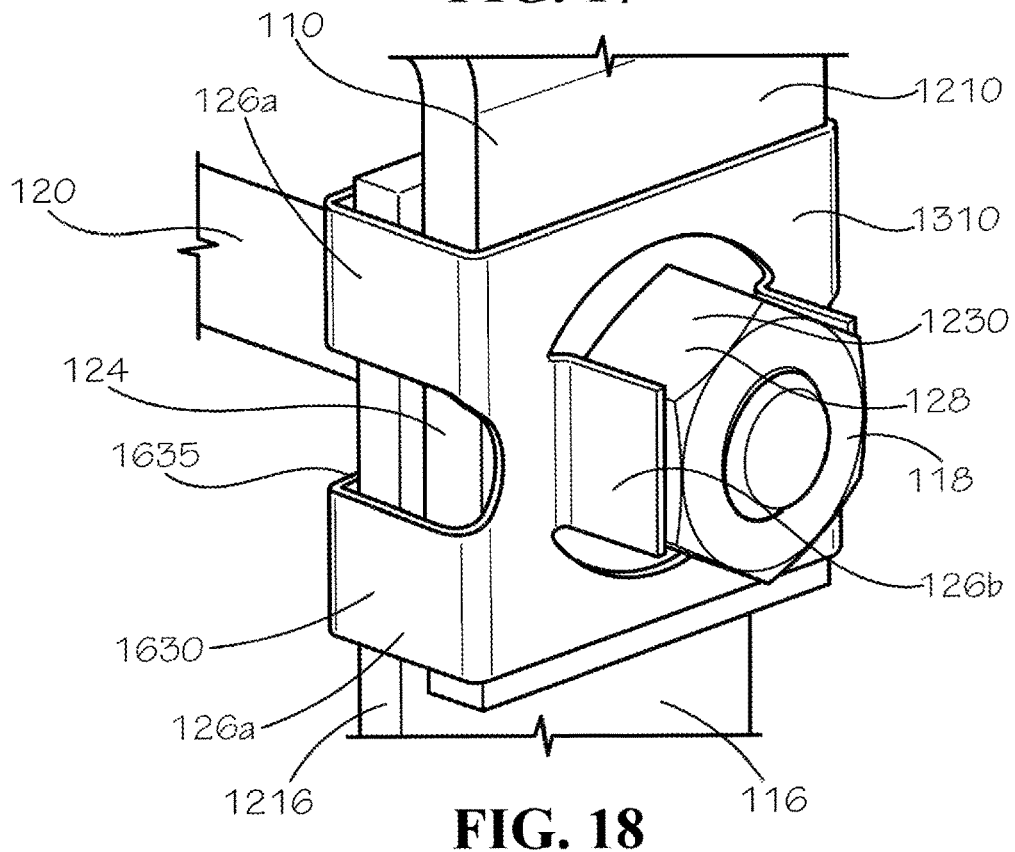
FIG. 18 is a detail front perspective view of the lock tab washer of FIG. 17 assembled with the hanger of FIG. 1.

FIGS. 17 and 18 illustrate the lock tab washer 104 according to another example aspect of the present disclosure. In the present aspect, the lock tab washer 104 can comprise the washer body 1310, and the washer body 1310 can define the circular hole 202 therethrough. As shown, a first pair of the edge tabs 126*a* can extend from the first side 1312 of the washer body 1310 and an opposite, second pair of the edge tabs 126*a* can extend from the second side 1314 of the washer body 1310. Each edge tab 126*a* can define the first edge tab end 1620 and the opposite second edge tab end 1625. Each edge tab 126*a* can further define the first portion 1630 extending from the first edge tab end 1620 and the second portion 1635 extending from the second edge tab end 1625. Each of the edge tabs 126*a* can be bent relative to the washer body 1310 in the first direction at a corresponding one of the first bend lines 304*a* generally at or near the first edge tab 126*a* end. In the present aspect, the first portion 1630 of each edge tab 126*a* can be bent at the corresponding first bend line 304*a* relative to the washer body 1310 at about a 90° angle, such that the first portions 1630 can be substantially perpendicular to the washer body 1310. Furthermore, in some example aspects, as shown, the second portions 1635 can be bent relative to the corresponding first portions 1630 at a corresponding one of the second edge bend lines 1650 at about a 90° angle, such that the second portions 1635 can be substantially parallel with the washer body 1310.

The lock tab washer 104 of the present aspect can also comprise two opposing nut tabs 126*b* extending from a peripheral edge 1710 of the circular washer hole 202. As shown, each of the nut tabs 126*b* can be bent at the corresponding second bend line 304*b* relative to the washer body 1310 in the second direction. In the present aspect, each of the nut tabs 126*b* can be bent at about 90° relative to the washer body 1310. Referring to FIG. 18, when assembled with the hanger 100 (shown in FIG. 12), the washer body 1310 can confront the front face 1210 of the upper clevis 110, the first portions 1630 of the edge tabs 126*a* can fold over and extend across the corresponding side edges 124,1216 of the upper clevis 110 and the lower clevis 116, and the second portions 1635 of the edge tabs 126*a* can wrap around the lower clevis 116 to confront the rear face 2360 (shown in FIG. 23) of the lower clevis 116. Furthermore, the two opposing nut tabs 126*b* can fold over and confront opposing faces 1230 of the circumferential side 128 of the nut 118 as shown.

Figure 19:
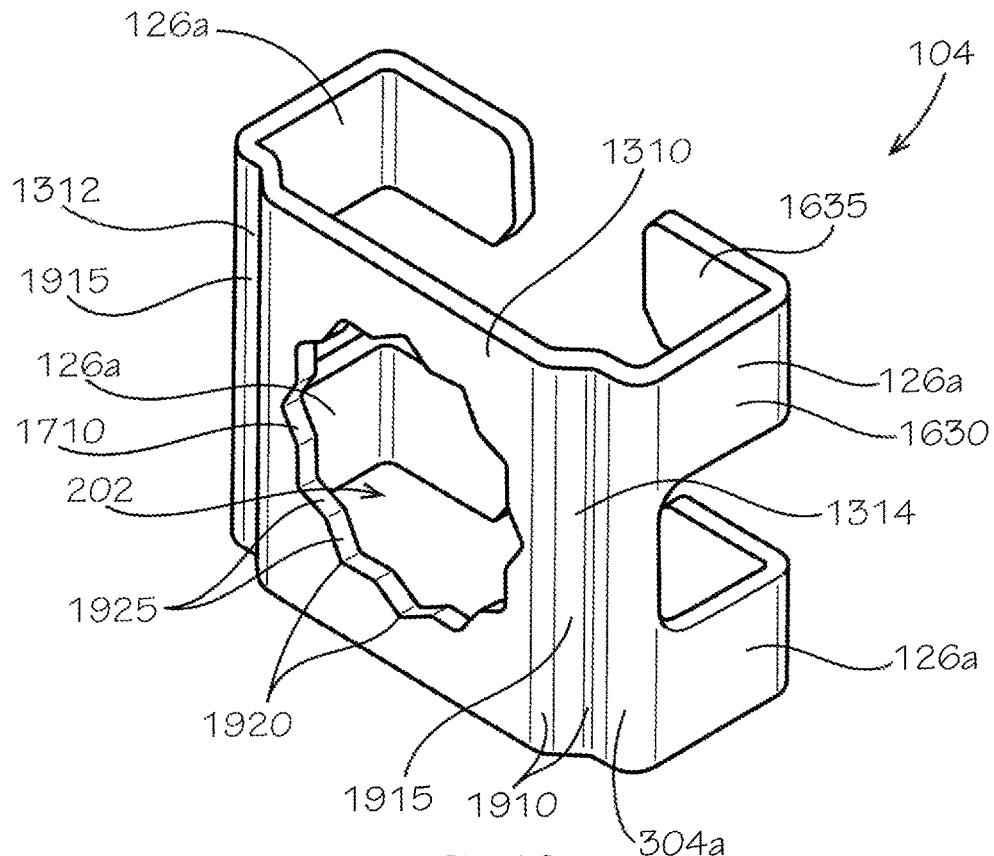
FIG. 19 is a front perspective view of the lock tab washer according to another aspect of the present disclosure.
Figure 20:
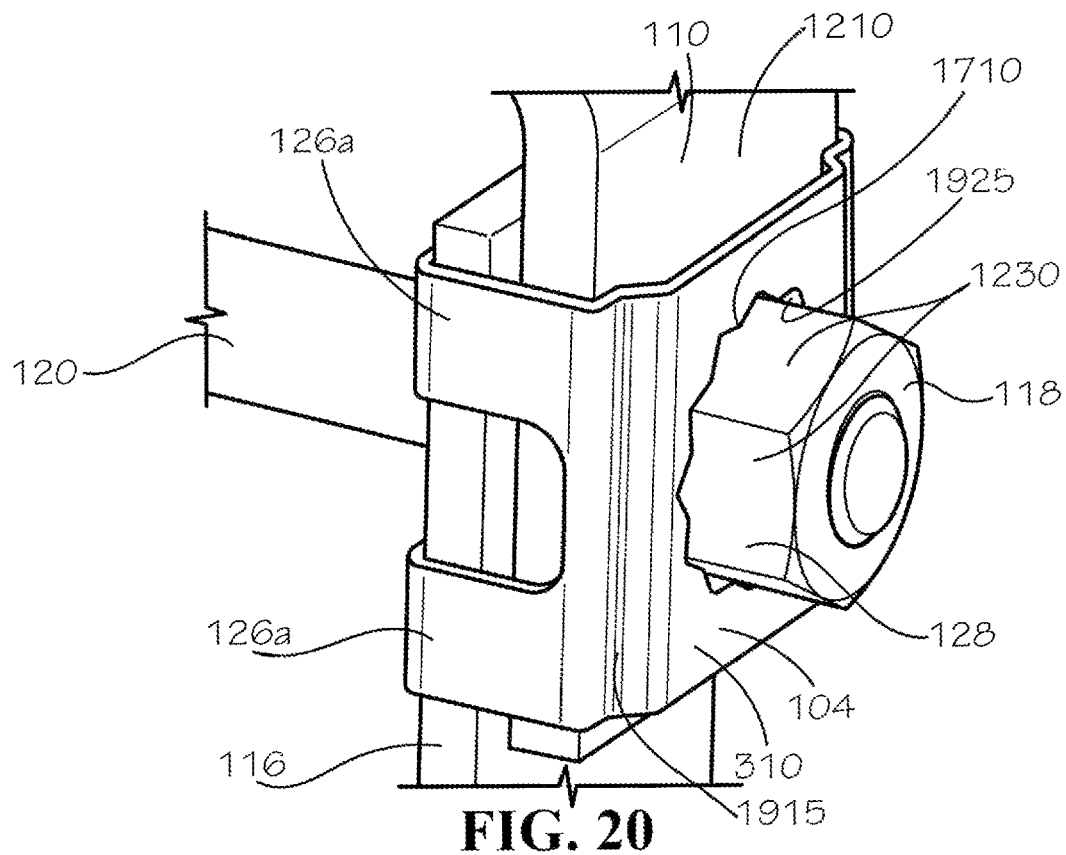
FIG. 20 is a detail front perspective view of the lock tab washer of FIG. 19 assembled with the hanger of FIG. 1.

FIGS. 19 and 20 illustrate the lock tab washer 104 according to another aspect of the present disclosure. The lock tab washer 104 can be similar in structure to the lock tab washer 104 of FIGS. 17 and 18. For example, the lock tab washer 104 can comprise the washer body 1310, the first pair of edge tabs 126*a* extending from the first side 1312 thereof, and the second pair of edge tabs 126*a* extending from the second side 1314 thereof. Each of the edge tabs 126*a* can define the first portion 1630 bent relative to the washer body 1310 and the second portion 1635 bent relative to the first portion 1630. However, in the present aspect, the washer body 1310 can define additional washer bend lines 1910 proximate to each pair of edge tabs 126*a*, such that an inward step 1915 is defined at each of the first side 1312 and second side 1314 of the washer body 1310. Furthermore, in the present aspect, the washer hole 202 formed through the washer body 1310 is not circular. Rather the peripheral edge 1710 of the washer hole 202 can generally define the shape of a star polygon, having a plurality of vertices 1920 and sides 1925. The sides 1925 of the peripheral edge 1710 can be configured to engage corresponding faces 1230 of the circumferential side 128 of the nut 118, as shown in FIG. 20, to prohibit rotation of the nut 118 relative to the lock tab washer 104. According to example aspects, the inward steps 1915 can be configured to space the washer body 1310 away from the front face 1210 of the upper clevis 110, such that the peripheral edge 1710 of the hole 202 can engage the nut 118 at a distance away from the upper clevis 110. To prohibit rotation of the lock tab washer 104 relative to the hanger 100 (shown in FIG. 12), the upper edge tabs 126*a* can be configured to wrap around the upper clevis 110 and lower clevis 116 of the hanger 100, as described above.

Figure 21:
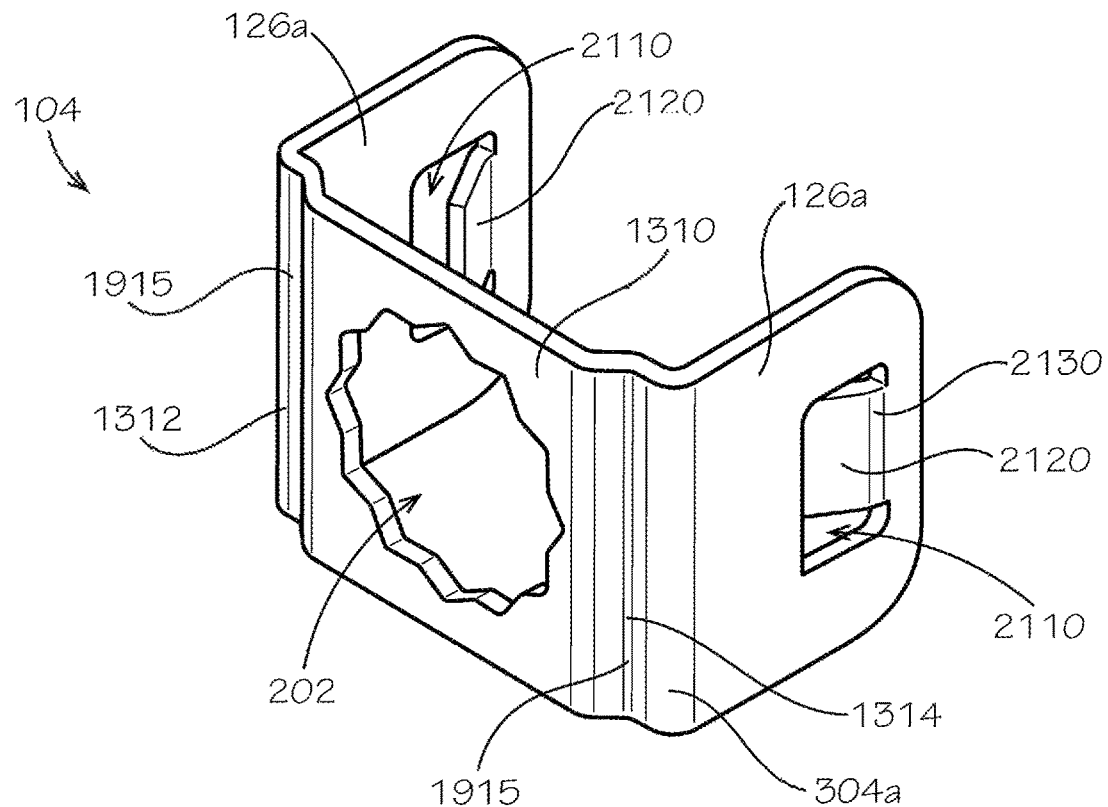
FIG. 21 is a front perspective view of the lock tab washer according to another aspect of the present disclosure.
Figure 22:
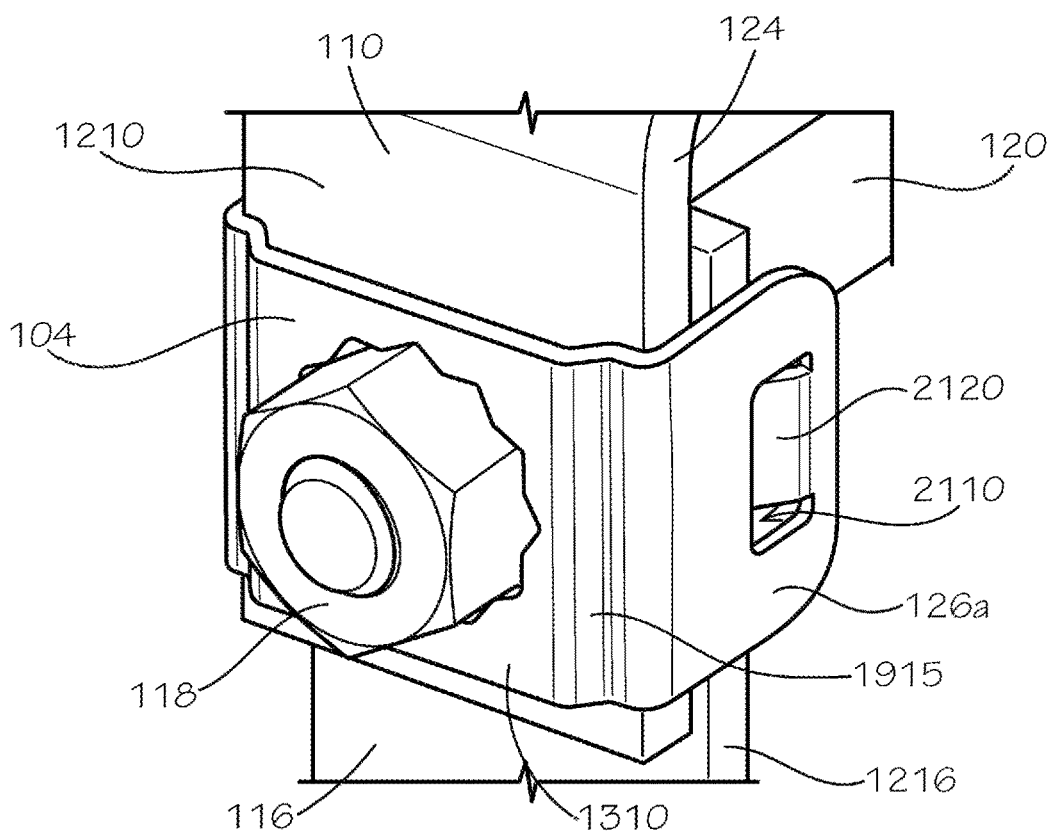
FIG. 22 is a detail front perspective view of the lock tab washer of FIG. 21 assembled with the hanger of FIG. 1.
Figure 23:
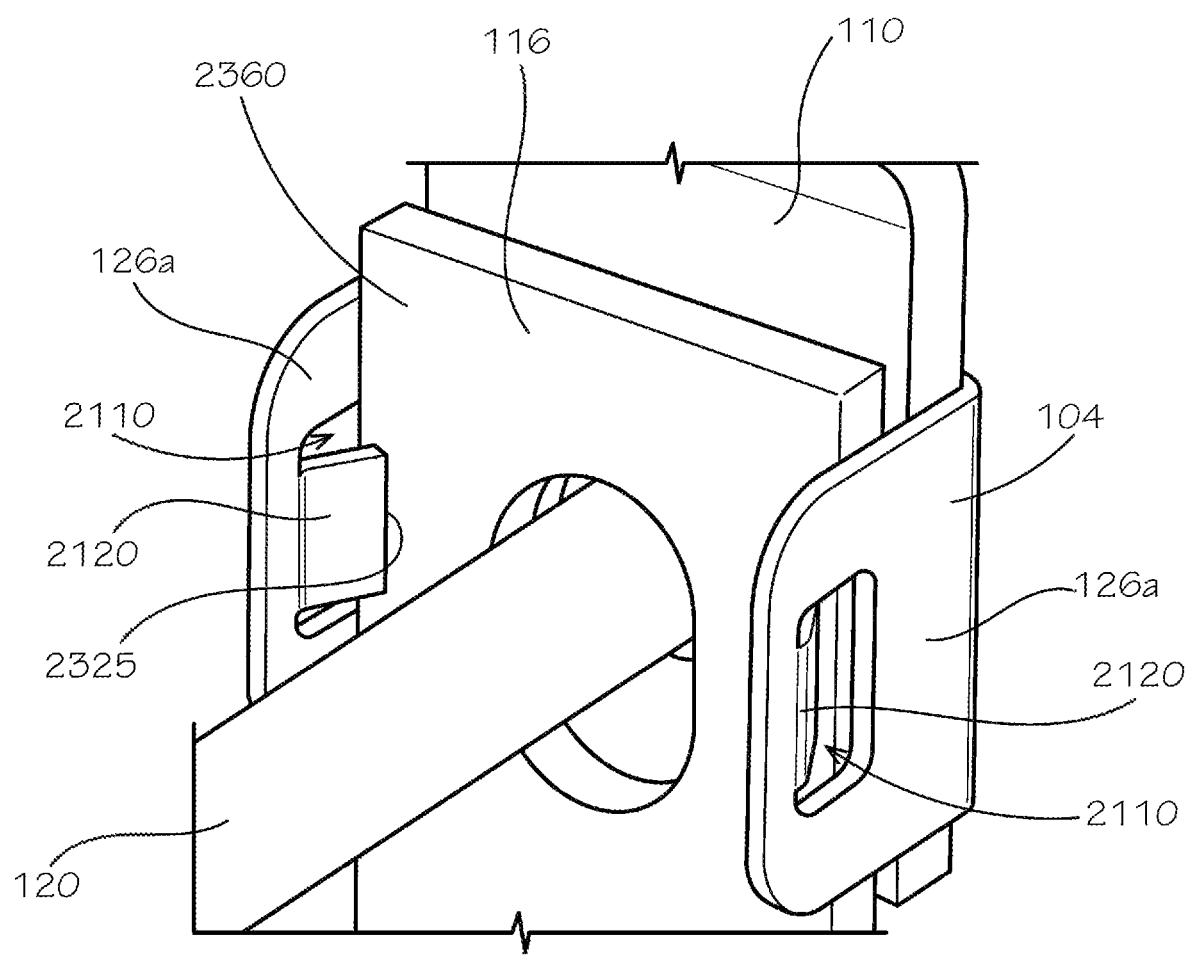
FIG. 23 is a detail rear perspective view of the lock tab washer of FIG. 21 assembled with the hanger of FIG. 1.

FIGS. 21-23 illustrate the lock tab washer 104 according to another example aspect of the disclosure. As shown, the lock tab washer 104 can define the star polygon-shaped washer hole 202 formed through the washer body 1310 and the inward steps 1915 formed at the first side 1312 and opposing second side 1314 of the washer body 1310. In the present aspect, a single one of the edge tabs 126*a* can extend from each of the first side 1312 and the second side 1314, and the edge tabs 126*a* can be bent at about 90° relative to the washer body 1310 at the corresponding first bend lines 304*a*. According to example aspects, each of the edge tabs 126*a* can define a substantially U-shaped slot 2110 formed therethrough, and a retainer tab 2120 can extend into each of the corresponding slots 2110. The opposing retainer tabs 2120 can be bent inward towards one another relative to the corresponding edge tabs 126*a*. In the present aspect, each of the retainer tabs 2120 can be bent inward about 45° relative to the corresponding edge tabs 126*a* at a retainer tab bend line 2130, though in other aspects, the retainer tabs 2120 may be bent at any other suitable angle. As shown in FIGS. 22 and 23, the inward steps 1915 of the washer body 1310 can confront the front face 1210 of the upper clevis 110 and each of the edge tabs 126*a* can extend across the side edges 124,1216 of the upper and lower clevises 110,116. Referring to FIG. 23, in example aspects, the edge tabs 126*a* can extend past the rear face 2360 of the lower clevis 116, and a distal end 2325 of each retainer tab 2120 can confront the rear face 2360 of the lower clevis 116 to sandwich the upper and lower clevises 110,116 between the washer body 1310 (shown in FIG. 22) and the retainer tabs 2120.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A pipe hanger comprising:
    a suspension member configured to engage a pipe, the suspension member comprising a side edge and defining a hole through the suspension member;
    a threaded rod extending through the hole;
    a nut threaded on the threaded rod, the nut defining a circumferential side, the circumferential side defining a first face and a second face; and
    a lock tab washer disposed on the threaded rod between the suspension member and the nut, the lock tab washer comprising a washer body, a first edge tab, a nut tab, and a wing extending from the nut tab, the first edge tab bent to fold over the side edge of the suspension member, the nut tab bent to fold over the first face of the circumferential side of the nut, the wing bent to fold over the second face of the circumferential side of the nut;
    wherein:
        a curvilinear bend relief notch is recessed into the washer body adjacent to the nut tab to facilitate bending the nut tab relative to the washer body;
        the washer body defines a washer hole therethrough, the threaded rod extending through the washer hole;
        the lock tab washer further comprises a second edge tab extending from the washer body;
        the second edge tab is parallel with the first edge tab;
        a gap is defined between the first edge tab and the second edge tab; and
        a convex, arcuate edge portion of the washer body extends across the gap from the first edge tab to the second edge tab.

2. The pipe hanger of claim 1, wherein the washer body defines a first side and a second side opposite the first side, the first edge tab extending from the first side of the washer body and the nut tab extending from the second side of the washer body.

3. The pipe hanger of claim 1, wherein the suspension member comprises an upper clevis and a lower clevis, the upper clevis joined to the lower clevis by the threaded rod and the nut.

4. The pipe hanger of claim 3, wherein the side edge of the suspension member comprises a side edge of the upper clevis, and wherein the first edge tab extends across the side edge of the upper clevis.

5. The pipe hanger of claim 1, wherein:
    the nut tab defines a first nut tab side edge and a second nut tab side edge opposite the first nut tab side edge;
    the wing is a first wing extending from and bent relative to the first nut tab side edge; and
    the lock tab washer further comprises a second wing extending from the second nut tab side edge, the second wing bent to fold over a third face of the circumferential side of the nut.

6. The pipe hanger of claim 1, wherein a width of the lock tab washer at the curvilinear bend relief notch is greater than a width of the nut tab.

7. The pipe hanger of claim 1, wherein the wing defines a curved distal edge that is distal to the nut tab.

* * * * *